United States Patent
Khude et al.

(10) Patent No.: US 11,405,171 B2
(45) Date of Patent: Aug. 2, 2022

(54) SYSTEM AND METHOD FOR CONTROLLING FULL DUPLEX COMMUNICATIONS AT AN ACCESS POINT

(71) Applicant: NXP USA, INC., Austin, TX (US)

(72) Inventors: Nilesh Nilkanth Khude, Pune (IN); Vijay Ahirwar, Pune (IN); Hari Ram Balakrishnan, Chennai (IN); Sri Varsha Rottela, Visakhapatnam (IN); Ankit Sethi, Pune (IN); Sudhir Srinivasa, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/797,735

(22) Filed: Feb. 21, 2020

(65) Prior Publication Data

US 2020/0274686 A1    Aug. 27, 2020

Related U.S. Application Data

(60) Provisional application No. 62/809,294, filed on Feb. 22, 2019.

(51) Int. Cl.
| | |
|---|---|
| *H04L 5/14* | (2006.01) |
| *H04W 74/00* | (2009.01) |
| *H04L 5/00* | (2006.01) |
| *H04W 74/08* | (2009.01) |
| *H04W 88/08* | (2009.01) |
| *H04W 72/04* | (2009.01) |

(52) U.S. Cl.
CPC .............. *H04L 5/14* (2013.01); *H04L 5/0007* (2013.01); *H04W 72/0453* (2013.01); *H04W 74/004* (2013.01); *H04W 74/006* (2013.01); *H04W 74/0816* (2013.01); *H04W 88/08* (2013.01)

(58) Field of Classification Search
CPC ...... H04L 5/14; H04L 5/0007; H04W 72/007; H04W 74/004
See application file for complete search history.

(56) References Cited

U.S. PATENT DOCUMENTS

| | | | | |
|---|---|---|---|---|
| 2009/0059831 | A1* | 3/2009 | Li | H04W 72/005 370/312 |
| 2013/0058273 | A1* | 3/2013 | Wentink | H04W 8/26 370/328 |
| 2014/0350872 | A1* | 11/2014 | Xu | H04L 7/0037 702/60 |
| 2016/0150391 | A1* | 5/2016 | Lee | H04L 5/0091 370/329 |
| 2016/0330007 | A1* | 11/2016 | Cherian | H04L 1/1685 |

(Continued)

*Primary Examiner* — Kevin M Cunningham

(57) ABSTRACT

A method for controlling communication of information includes selecting a group of stations within range of an access point, transmitting a first signal from the access point to a first station in the group, and receiving at the access point a second signal from a second station in the group. The first signal is transmitted to the first station through a downlink channel. The second signal is received from the second station through an uplink channel. Transmission of the first signal takes place during a first period and reception of the second signal takes place during a second period overlapping the first period, in order to perform full-duplex different-frequency communications based on an 802.11 standard between the access point and the first station and the second station.

22 Claims, 17 Drawing Sheets

(56) References Cited

U.S. PATENT DOCUMENTS

| | | | |
|---|---|---|---|
| 2019/0089515 A1* | 3/2019 | Madhavan | H04L 5/0073 |
| 2019/0296885 A1* | 9/2019 | Cherian | H04L 5/0091 |
| 2020/0145175 A1* | 5/2020 | Hassan Hussein | H04W 72/082 |
| 2020/0274686 A1* | 8/2020 | Khude | H04L 5/0007 |
| 2021/0176033 A1* | 6/2021 | Oteri | H04L 5/14 |

* cited by examiner

SYSTEM AND METHOD FOR CONTROLLING FULL DUPLEX COMMUNICATIONS AT AN ACCESS POINT

CROSS-REFERENCE TO RELATED APPLICATIONS

This application claims benefit to U.S. Provisional Patent Application No. 62/809,294 filed Feb. 22, 2019, the contents of which are incorporated herein by reference for all purposes.

FIELD

Example embodiments disclosed herein relate to communication systems and methods.

BACKGROUND

Various systems have been developed to manage communications among devices in a network. In some networks (including but not limited ones operating based on an 802.11 standard), full-duplex communications between devices is not possible because of the interference that takes place between signals transmitted on commonly used frequencies. Accordingly, improvements in managing communications among devices in a network are needed.

SUMMARY

In accordance with one or more embodiments, an access point includes transmitter logic configured to transmit a first signal; receiver logic configured to receive a second signal; and a controller to select a group of stations within range of the access point, wherein the controller is configured to control the transmitter logic to transmit the first signal to a first station of the group of stations through a downlink channel and to control the receiver logic to receive the second signal from a second station of the group of stations through an uplink channel, the first signal transmitted during a first period and the second signal received during a second period overlapping the first period to perform full-duplex different-frequency (FDDF) communications based on an 802.11 standard between the access point and the first station and the second station.

The downlink channel may correspond to a first frequency band in the operating bandwidth of the access point, and the uplink channel corresponds to a second frequency band in the operating bandwidth of the access point. The first signal may include a first data packet with a first termination point, the second signal may include a second data packet with a second termination point, and the first termination point of the first data packet may be aligned in time with the second termination point of the second data packet. The FDDF communications may be based on the 802.11 standard implemented for orthogonal frequency division multiple access (OFDMA).

The controller may control the transmitter logic to transmit the first data packet before the receiver logic receives the second data packet. The first data packet may include trigger information to initiate FDDF communications with the first and second stations. The controller may control the transmitter logic to transmit a first acknowledgement signal to the second station at a time aligned with receipt of a second acknowledgment signal from the first station. The first data packet may include a medium access control (MAC) header including a group identifier, and the group identifier may indicate that the first station and the second station are in the group of stations. The controller may control exchange of request-to-send (RTS) and clear-to-send (CTS) messages with the first station to initiate the FDDF communications. The receiver logic may receive a request-to-send (RTS) message from the first station and the transmitter logic is configured to transmit a clear-to-send (CTS) message to the second station to initiate the FDDF communications.

In accordance with one or more embodiments, a method for controlling communication of information includes selecting a group of stations within range of an access point; transmitting a first signal from the access point to a first station in the group; receiving at the access point a second signal from a second station in the group; wherein the first signal is transmitted to the first station through a downlink channel and the second signal is received from the second station through an uplink channel and wherein transmission of the first signal is during a first period and reception of the second signal is during a second period overlapping the first period to perform full-duplex different-frequency (FDDF) communications based on an 802.11 standard between the access point and the first station and the second station.

The downlink channel may correspond to a first frequency band in the operating bandwidth of the access point, and the uplink channel may correspond to a second frequency band in the operating bandwidth of the access point. The first signal may include a first data packet with a first termination point, the second signal may include a second data packet with a second termination point, and the first termination point of the first data packet may be aligned with the second termination point of the second data packet. The FDDF communications may be based on the 802.11 standard implemented for orthogonal frequency division multiple access (OFDMA). The first data packet may be transmitted before the second data packet is received. The first data packet may include trigger information to initiate FDDF communications with the first and second stations.

The method may include transmitting a first acknowledgement signal from the access point to the second station at a time aligned with reception of a second acknowledgment signal from the first station. The first data packet may include a medium access control (MAC) header including a group identifier and wherein the group identifier indicates that the first station and the second station are in the group of stations. The method may include controlling exchange of request-to-send (RTS) and clear-to-send (CTS) messages between the access point and the first station to initiate the FDDF communications. The method may include receiving at the access point a request-to-send (RTS) message from the first station, and transmitting a clear-to-send (CTS) message from the access point to the second station to initiate the FDDF communications.

In accordance with one or more embodiments, a method for controlling communications includes broadcasting a polling signal within range of an access point informing stations to transmit broadcast signal; receiving a first broadcast signal from a first station; receiving a second broadcast signal from a second station; broadcasting a report collection signal to the first and second stations informing stations to transmit response signal comprising of measurement reports; receiving a first response signal from a first station; receiving a second response signal from a second station; and assigning the first station and the second station a group identifier indicating that the first and second stations are in a first group for performing full-duplex communications, wherein the full-duplex communications includes simultaneous transmit and receive messaging based on an 802.11 standard implemented between an access point broadcasting the polling signal and the report collection signal and the first station and the second station.

In accordance with one or more embodiments, a method for controlling communications includes determining that a first station and a second station are in a same group; transmitting a first packet from an access point to the first station over a first channel; and receiving, at the access point, a second packet from the second station over a second channel, wherein the first packet includes a group identifier indicating that the first and second stations are in the same group, the first packet transmitted in a first period and the second packet received during a second period overlapping the first period, and wherein termination points of the first and second packets are aligned to perform full-duplex communications based on an 802.11 standard. The method may include performing request-to-send (RTS) and clear-to-send (CTS) messaging between the access point and at least one of the first station and the second station prior to transmission of the first packet to the first station.

In accordance with one or more embodiments, a method for controlling communications includes generating a plurality of sets of coefficients for a filter, the plurality of sets of coefficients corresponding to respective ones of a plurality of gains of a low noise amplifier, the low noise amplifier included in a receiver of a transceiver, determining a gain of the low nose amplifier, configuring the filter based on the set of coefficients corresponding to the determined gain of the low noise amplifier, receiving a signal from a device through an uplink channel; and suppressing transmitter leakage in the received signal based on the filter, wherein the transceiver is in a device performing full-duplex communications based on an 802.11 standard implemented between an access point and a plurality of stations within range of the access point. The filter may include a cascaded plurality of filter stages, each filter stage having a stage gain proportional to one or more corresponding filter stage coefficients, and the method may include selecting a combination of the cascaded plurality of filter stages that have stage gains that, when added together, produce the gain at least substantially matches the determined gain of the low noise amplifier.

In accordance with one or more embodiments, an access point includes transmitter logic configured to transmit a first signal; receiver logic configured to receive a second signal; and a controller to select a group of stations within range of the access point, wherein the controller is configured to control the receiver logic to receive the first signal from a first station of the group of stations through a uplink channel and to control the transmitter logic to transmit the second signal to a second station of the group of stations through an downlink channel, the first signal received during a first period and the second signal transmitted during a second period overlapping the first period to perform full-duplex different-frequency (FDDF) communications based on an 802.11 standard between the access point and the first station and the second station.

In accordance with one or more embodiments, a method for controlling communication of information includes selecting a group of stations within range of an access point; receiving a first signal at the access point from a first station in the group; transmitting from the access point a second signal to a second station in the group; wherein the first signal is transmitted from the first station through an uplink channel and the second signal is received by the second station through a downlink channel and wherein reception of the first signal is during a first period and transmission of the second signal is during a second period overlapping the first period to perform full-duplex different-frequency (FDDF) communications based on an 802.11 standard between the access point and the first station and the second station.

BRIEF DESCRIPTION OF THE DRAWINGS

Additional objects and features of the invention will be more readily apparent from the following detailed description and appended claims when taken in conjunction with the drawings.

Although several example embodiments are illustrated and described, like reference numerals identify like parts in each of the figures, in which.

DETAILED DESCRIPTION

Figure 1:
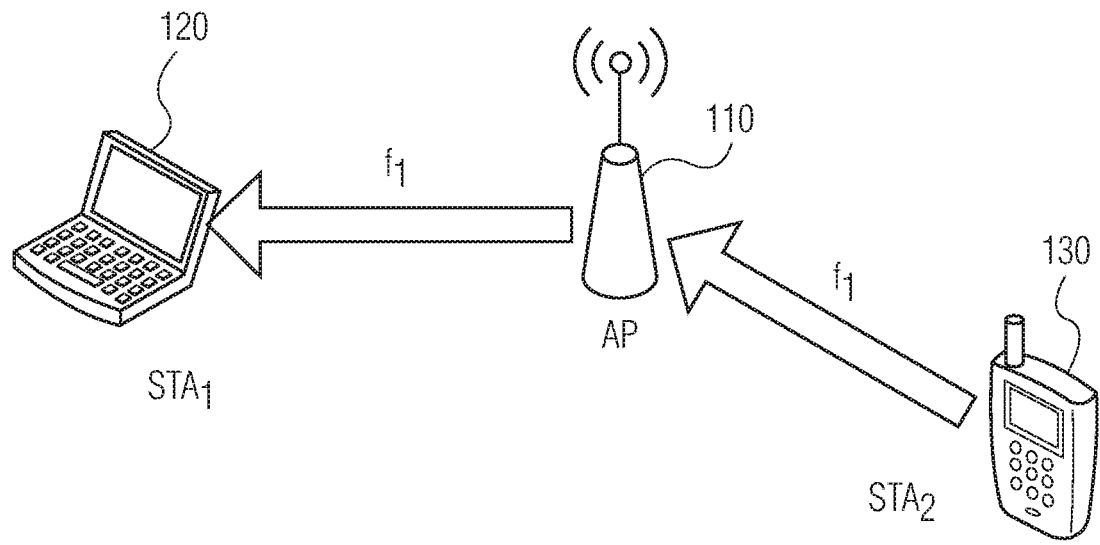
FIG. 1 illustrates an embodiment for performing full-duplex communications.

It should be understood that the figures are merely schematic and are not drawn to scale. It should also be understood that the same reference numerals are used throughout the figures to indicate the same or similar parts. Additionally, the first digit of a three-digit reference numeral or the first two digits of a four-digit reference numeral refers to the figure in which the reference numeral first appears.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Example embodiments described herein provide a system and method for controlling full-duplex communications among devices in a network environment. In some embodiments, full-duplex communications is provided and managed in the family of IEEE 802.11 protocols which have come to be known as a WiFi network. In one embodiment, a half-duplex over-the-air modulation protocol may be used.

In one embodiment, the protocol is used with an orthogonal frequency division multiple access (OFDMA) scheme. Unlike a half-duplex device, a device which performs full-duplex communications simultaneously transmits and receives signals in the network on the same frequency or in frequency bands within a same operating bandwidth. As a result, throughput gain is achieved that is almost twice the amount of data transmitted at a given time. It is noted that the current 802.11 set protocols uses primarily half-duplex over-the-air modulation techniques in order to avoid interference.

FIG. 1 illustrates an example of an access point (AP) 110 that communicates with two devices in a WiFi network. The access point has a predetermined WiFi range and may connect stations within this range to the Internet. In this example, the devices include a first station (STA1) 120 and a second station (STA2) 130. The first and second stations may be any of a variety of devices, including but not limited to smartphones, tablets, notebook computers, or other types of user devices both mobile and stationary.

In accordance with one embodiment, full-duplex communication is performed between the access point 110 and one or more stations communicating on the same frequency at the same time. For example, the access point 110 may transmit packets to the first station 120 on the same frequency $f_1$ and at the same time receive packets from the second station 130 on frequency $f_1$, thereby supporting simultaneous transmit and receive (STR). This may be accomplished, for example, by changing the medium access control (MAC) protocol software controlling communications performed by the access point and stations STAs in the WiFi network.

Full Duplex Different Frequency

Figure 2:
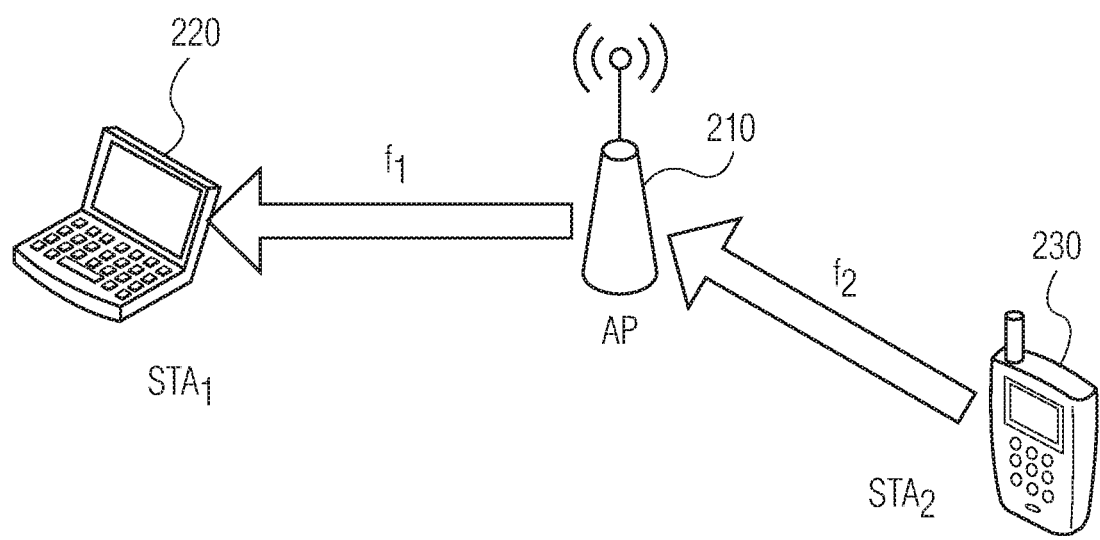
FIG. 2 illustrates an embodiment for performing full-duplex different-frequency communications.

FIG. 2 illustrates an embodiment of a system for controlling communications between a wireless access point and multiple stations using a full-duplex different-frequency (FDDF) method. In this FDDF embodiment, an access point 210 may communicate with different stations 220 and 230 within range of the access point, at the same time but at different frequencies within the operating bandwidth of the access point. For example, the access point may transmit packets to station (STA1) 220 through a downlink channel and may receive packets from station (STA2) 230 through an uplink channel, where the downlink and uplink changes are in different bands of the operating bandwidth of the access point.

Referring to FIG. 2, the system includes an access point 210 and stations 220 and 230. The access point 210 may transmit signals to the first station 220 through the downlink channel at a frequency $f_1$ and at the same time receive signals from the second station 230 through the uplink channel at a different frequency $f_2$. In this example, frequency $f_1$ may be within the bandwidth of the transmitter of the access point and frequency $f_2$ may be in the bandwidth of the receiver of the access point. These bandwidths may overlap one another or be included in an overall operating bandwidth of the access point.

For the sake of illustration, consider the case where the operating bandwidth of the access point 210 is 80 MHz. This bandwidth may be partitioned into a first frequency band for the downlink DL channel of A MHz, e.g., DL BW=A MHz. This leaves the remaining portion of the operating bandwidth as corresponding to a second frequency band for the uplink UL channel, e.g., UL BW=80 MHz−A MHz. In this scenario, A may be 20 MHz, 40 MHz, or 60 MHz, e.g., A={20, 40, 60}, but other values may be used as well. In some embodiments, full duplex and full duplex different frequency communication exemplified in FIG. 1 and FIG. 2 may also be performed between only two devices. For example, access point and station STA1 may transmit to and receive from each other and STA2 may not be involved in the communication. In this scenario, station STA1 may also have the ability to simultaneously transmit and receive either on the same frequency or on the frequencies in the same operating band.

Figure 3:
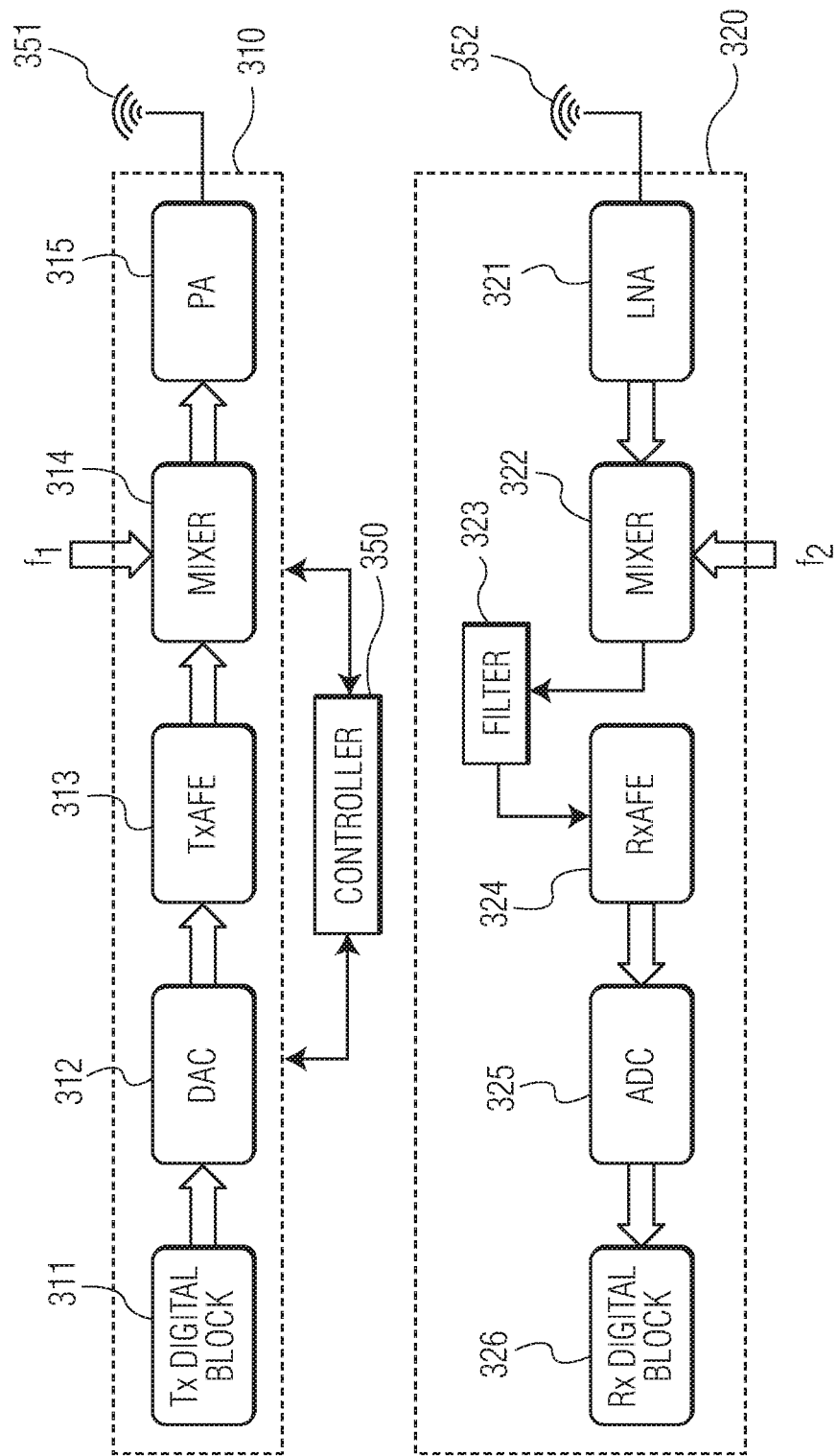
FIG. 3 illustrates an embodiment of a transceiver in a communications device.

FIG. 3 illustrates an embodiment of the transceiver logic that may be included in the access point for controlling full-duplex communications for stations 220 and 230. The transceiver logic includes a transmitter signal path 310 and a receiver signal path 320, which may be implemented in software, hardware, or both. In a software implementation, the transceiver logic may include a processor that executes instructions stored in a memory of the access point to perform the operations used to simultaneously transmit and receive signals.

The transmitter signal path 310 includes a transmitter digital block 311, a digital-to-analog converter 312, a transmitter analog front end 313, a mixer 314, a power amplifier 315, and an antenna 351. The transmitter digital block receives a baseband signal containing data to be transmitted from the access point to the station 230 through the downlink DL channel. The data may be received, for example, from the internet and may be in digital form. The digital-to-analog converter 312 may convert the data in the baseband signal to an analog signal, and the transmitter analog front end 313 may perform operations including filtering and amplifying the analog signal. The mixer 314 may perform a frequency translation of the analog signal output from the transmitter analog front end 313 to a predetermined frequency within the downlink frequency band, e.g., to frequency $f_1$. Finally, the power amplifier 315 may amplify the frequency-translated signal for transmission, via the uplink channel, to station 230 through antenna 351.

The receiver signal path 320 includes a low noise amplifier 321, a mixer 322, a filter 323, a receiver analog front end 324, an analog-to-digital converter 325, a receiver digital block 326, and an antenna 352. The low noise amplifier 321 receives and then amplifies a signal transmitted by station 220 through the uplink channel and antenna 352. The mixer 322 performs a frequency translation function based on the receiving frequency $f_2$ to recover either an intermediate signal or the baseband signal. (If the mixer 322 recovers an intermediate signal, a second mixer may be included along with signal path to recover the baseband signal).

The filter 323 is used to remove interference attributable to the signal transmitted by the transmitter of the access point. More specifically, because the access point is simultaneously transmitting and receiving signals to/from different ones of stations 220 and 230, the signals transmitted to station 230 may appear as cross-interference that adversely affects the ability of the receiver to recover received signals transmitted by station 220. This is because these signals communicated with the stations 220 and 230 are within the same operating bandwidth of the transceiver logic of the access point and are occurring at the same time. In order to improve the ability of the access point receiver to receive the signals from the station 220 on the uplink channel, the filter 323 may be a band stop filter that suppresses or removes signals received in the frequency band used by the access point transmitter to transmit signals to station 230. In addition to cross-interference, a process of performing cancellation of self-interference may also be performed, for example, in the mixer or at another point along the signal path of the receiver logic.

The receiver analog front end 324 performs additional filtering and amplification operations, and the analog-to-digital converter 325 converts the output of the receiver analog front end to a digital signal based on a predetermined quantization algorithm. Finally, the receiver digital block 326 recovers the data from the baseband signal and sends the data to a destination, for example, as indicated in the header of a packet that corresponds to the signal received from the station 230 on the uplink channel.

A controller 350 controls operations of the transceiver logic, including activation, timing constraints, synchronization, polling and pairing of stations within the range of access point, echo cancellation, and other operations. The controller may perform these functions based on instructions stored in a memory of the access point. The memory may be included in a same chip or printed circuit board as the transceiver logic or may be included at a different location of the access point circuitry.

Figure 4:
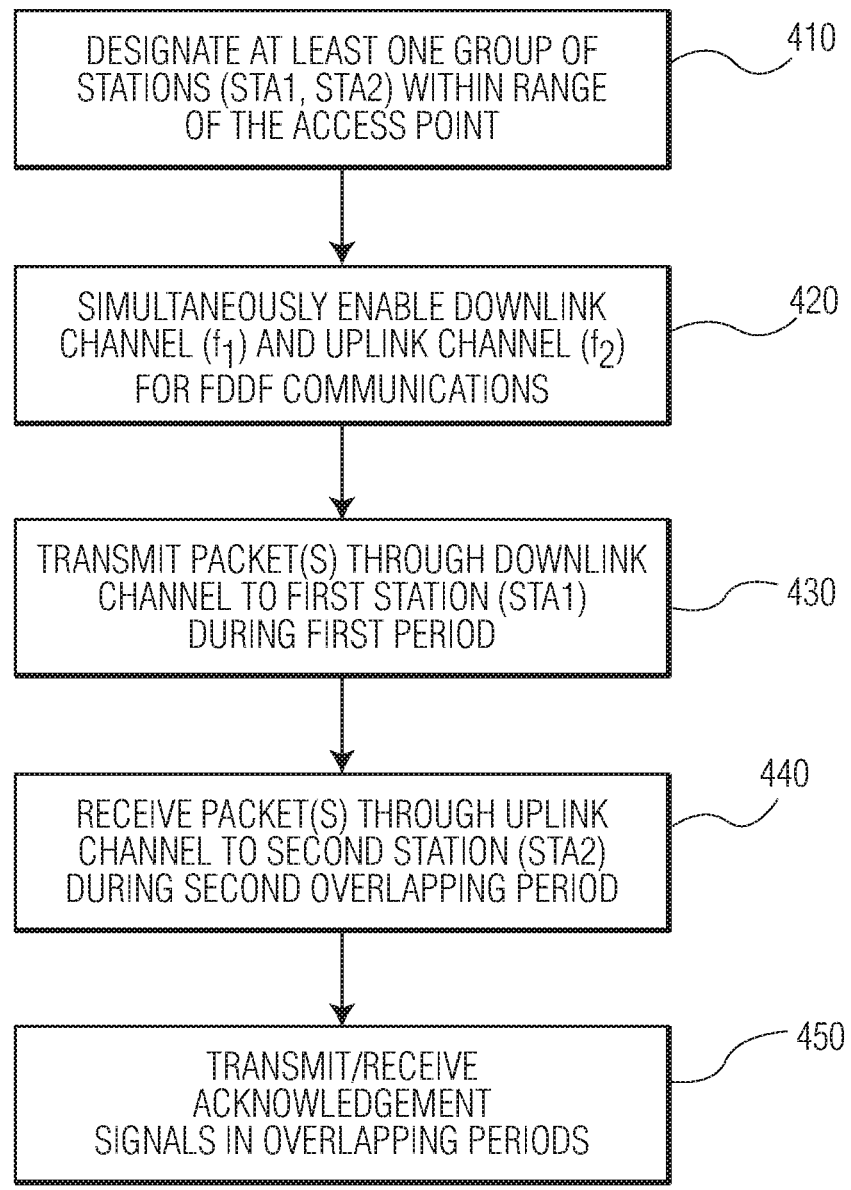
FIG. 4 illustrates an embodiment for controlling FDDF communications.

FIG. 4 illustrates an embodiment of a method for controlling simultaneous transmission and reception of signals using an FDDF algorithm. The method may be performed, for example, by the system of FIG. 3 or may be performed by a different system included in the access point. In this embodiment, both stations 220 and 230 are equipped with control software and protocols to perform full-duplex communications, as well as the access point.

Referring to FIG. 4, the method includes, at 410, designating at least one group of stations within range of the access point. The at least one group may be formed, for example, based on a polling operation followed by a subsequent grouping (or pairing) process of the stations that were polled. The polling and grouping operations may be performed by controller 350 in a manner to be described in greater detail below. In this example, the grouping process will be assumed to form a group including a pair of stations 220 and 230. In another embodiment, each group may include more than two stations. Also, a station in any one group may be included in one or more other groups.

At 420, once the at least one group has been designated, the downlink and uplink channels of the access point transceiver logic are simultaneously enabled to communicate simultaneously with stations 220 and 230 in the group. As previously indicated, the downlink and uplink channels correspond to different frequencies (or frequency bands) in the operating bandwidth of the access point and each of the stations, as illustratively shown in FIG. 2.

Because of the pairing of stations, FDDF communications may be controlled so that (1) the period the access point transmits data to station 230 over the downlink channel DL overlaps the period which the access point receives data from the station 220 on the uplink channel UL, and (2) those periods end at the same time, or approximately so, in order to prevent a hidden node problem. This may be accomplished by the controller 350 by indicating the transmission duration in the packet header. In 802.11 (WiFi), this is accomplished by setting network allocation vector (NAV) in the packet header. From the start time of the first transmission (say DL transmission) and its packet duration, the transmitter if the second transmission (UL, in this case) adjusts its transmission duration such that both transmissions end at the same time.

Figure 5A:
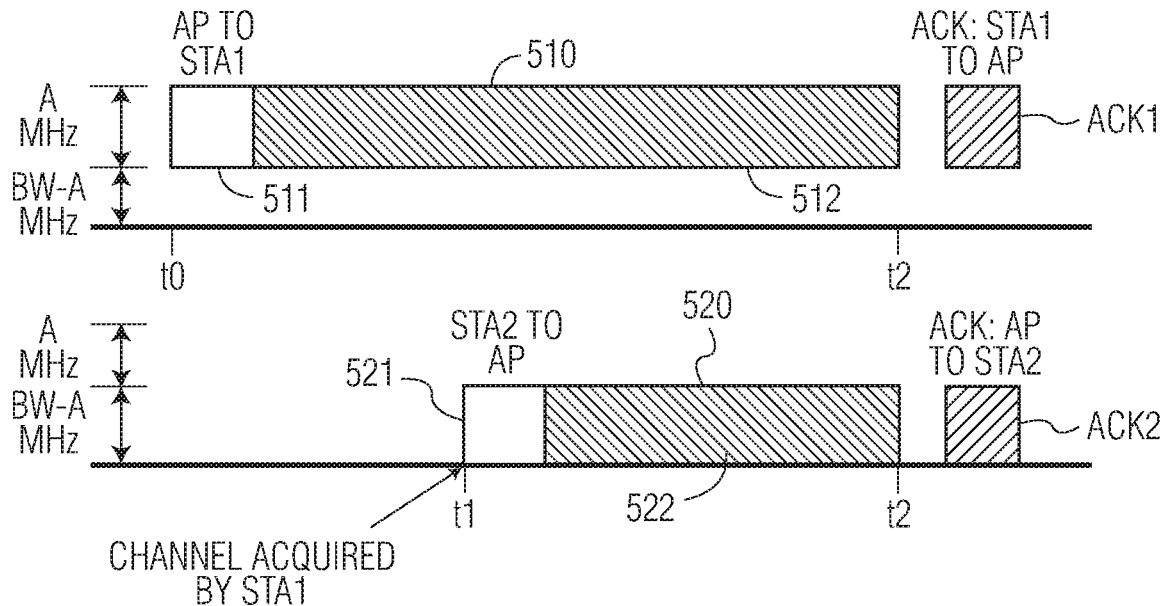
FIGS. 5A and 5B illustrate examples of packets that are transmitted and received in an embodiment for performing FDDF communications.
Figure 5B:
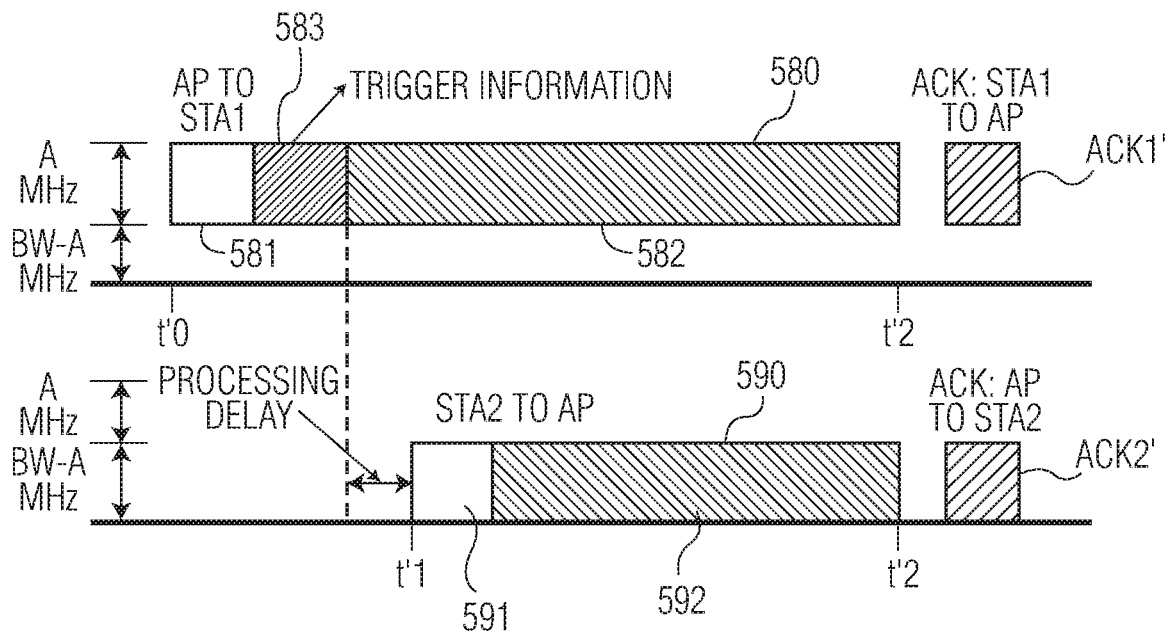

At 430, the access point transmits one or more data packets (e.g., protocol data units (PDUs)) to station 220 (STA1) over the downlink DL channel. An example of these features is shown in FIG. 5A, which illustrates the case where the access point (AP) transmits a data packet 510 to station 220 (STA1) through the downlink DL channel, which is in the A MHz frequency band. The data packet 510 includes a header 511 and a data payload 512. The header may include routing and other information that may be processed by the access point to ensure arrival at an intended destination. The duration of the packet 510 is a first period between time $t_0$ and time $t_2$, which is also indicated in the header At 440, station 230 (STA2) acquires the uplink channel of the access point and then transmits one or more data packets 520 to the access point over this channel. The access point receives the data packet 520 over the uplink channel during the period of transmission of data packet 510 to station 220, e.g., the access point simultaneously receives one or more data packets from station 230 during this time, thereby supporting full-duplex communications over a different frequency (FDDF). An example of these features is shown in FIG. 5B, which illustrates the case where the access point receives the data packet 590 from station (STA2) 230. The data packet includes packet header 591 and data payload 592 received over the uplink UL channel (the BW-A MHz frequency band) over a period beginning at time $t_1$ and ending at time $t_2$.

From a comparison of FIGS. 5A and 5B, it is evident that the transmission period of data packet 510 and the reception period of data packet 520 are aligned, in that both have at least a same (or substantially the same) termination point $t_2$ based on implementation of the present simultaneous transmit and receiver (STR) process. Aligning the termination points of the uplink and downlink periods of packets 510 and 520 may reduce the probability of a hidden node problem occurring and may also prevent acknowledgment messages from colliding (e.g., overlapping) with data transmissions. In accordance with at least one embodiment, the termination points of the packets may be aligned within they are within a predetermined tolerance range of few microseconds. In case of FDDR, this tolerance is determined by the time required by the transmitter and receiver chain to switch from frequency $f_1$ to $f_2$ and vice versa. The tolerance is also determined by the receiver to complete decoding and prepare the ACK packet.

At 450, the access point receives an acknowledgment signal (ACK1) from station 220 to confirm receipt of data packet 510 by station STA1 and transmits an acknowledgment signal (ACK2) to station 230 to confirm receipt of the data packet 520 from station STA2. These acknowledgment signals are transmitted/received in overlapping (or aligned) periods as a result of the alignment of the termination points of data packets 510 and 520. Thus, controlling the transmission and reception times of packets 510 and 520 to be aligned prevents the acknowledgment signal transmitted on one of the uplink or downlink channels from interfering with data transmissions of the other of the uplink or downlink channels between the access point and stations in the same group.

The aforementioned method applies in the case where one of the stations initiates the full-duplex different-frequency method performed by the controllers of the access point and stations paired within the same group. In one embodiment, the access point may initiate the FDDR method, in a manner illustrated, for example, in FIG. 5B discussed below.

FIG. 5B illustrates an example of the case where the access point initiates transmission of a data packet 580 to station 220 over the downlink DL channel (e.g., frequency band A MHz). Data packet 580 includes a header 581, a data payload 582, and trigger information 583. In one embodiment, the trigger information may be one or more bits inserted into a predetermined field of the header 580 by the controller 350 of the access point. The addition of the trigger information increases the length, and thus the duration, of the data packet 581 compared to the case illustrated in FIG. 5A. This transmission duration corresponds to the duration between time $t'_0$ and time $t'_2$.

As also illustrated in FIG. 5B, a data packet 590 is received by the access point from station 220 through the uplink UL channel (frequency band BW-A). The data packet 590 is received during a period which overlaps the transmission period of data packet 580. Data packet 590 includes a header 591 and a data payload portion 592 and has a duration between time $t'_1$ and time $t'_2$. The data packet 590 may start after a processing delay that follows the reception of the trigger information. This processing delay facilitates decoding of the trigger information as well as preparation of the packet 590. The increase in transmission time may be a predetermined time accessible by the controller 350 of the access point. Aligning the ends of the data packets 580 and 590 allows the acknowledgement signals (ACK1' and ACK2') from colliding with the data packets 580 and 590, thereby improving communication quality.

In the aforementioned embodiments, the methods are applied in a WiFi system performing orthogonal frequency division multiple access (OFDMA). This type of multiple access communication scheme may increase the efficiency and capacity of wireless networks, by allowing multiple stations to communicate simultaneously (as described above) because the operating bandwidth of the access point is allocated on at least two primary channels.

In one example OFDMA implementation, the resource unit (RU) sizes may be one or more of 242 subcarriers (20 MHz), 484 subcarriers (40 MHz), and 996 subcarriers (80 MHz). The access point may support these resource units as well as RUs for 60 MHz. Each RU may refer to a group of 78.125 kHz bandwidth subcarriers (tones) used in both DownLink (DL) and UpLink (UL) transmissions. Different transmit powers may be applied to different RUs. For an access point with an 80 MHz operating bandwidth, the downlink primary channel may be at 20 MHz and the uplink primary channel may be 60 MHz.

Initiation of full-duplex different-frequency (or FD) communications may be performed in a number of ways. In one embodiment, if station 230 (STA2) determines that one of the primary channels is free and the capability field in the beacon indicates that the access point is able to operate in full-duplex mode, then station 230 can initiate the full-duplex mode of the access point. The clear channel assessment (CCA) may be performed by the stations and the access point through the carrier sensing mechanism defined by 802.11 standards. The FD or FDDF capabilities of the access point may be broadcast in the capability field as part of the periodic beacon transmission. FD or FDDF capabilities of the station (and optionally also of the access point) can be exchanged during the association process. (i.e., when a station associates with the AP). Allocation of UL and DL channels can also be part of the beacon or association handshake.

In another embodiment, the FDDF or FD mode may be initiated by the access point. In this case, the trigger information for the uplink channel may be part of the message in the data packet transmitted in the downlink channel to station 220. Thus, the uplink OFDMA can be utilized.

For example, when the access point initiates FD or FDDF mode, the trigger information is included in the data packet transmitted to station 220 on the downlink channel. The trigger information may include the information for station 230 to initiate the UL transmission, such as duration of the packet, the bandwidth/RU allocation, modulation and coding index, number of spatial streams etc. In this case, the access point may receive the data packet from station 230 on the uplink channel at the end of (or after) the trigger information portion of the data packet transmitted on the downlink channel. In this case, the preamble portion is not required to be in the data packet transmitted from station 230 to the access point through the uplink channel. In one embodiment, the data packet transmitted on the uplink channel may, in this case, include only the high-efficiency short-training field (HE-STF) onwards. Trigger information optimizes resource utilization. In some embodiments, the trigger information can be optional and STA2 can determine the transmission parameters of the packet. Such packet may contain all the legacy preamble fields.

In one embodiment, the channel may be partitioned so that the minimum portion is not 20 MHz. For example, for a 26 sized RU, the uplink channel may be limited to a size of 52/106 sized RU. Such an embodiment may be used, for example, when the full-duplex mode is enabled between the access point and one of the stations, which supports full-duplex mode. These embodiments may also be used when the uplink channel requires a smaller bandwidth compared to the bandwidth of the downlink channel.

The FDDF method may achieve a number of benefits in at least some circumstances. One benefit may be lower latency, e.g., the FDDF method may reduce the latency per specific station and/or latency in the entire network in terms of, for example, acknowledgment (ACK) time and short inter-fame space (SIFS) period reduction. Another benefit may be collision reduction, e.g., the downlink signal DL may prevent potential hidden nodes from transmitting during transmission of the uplink signal UL. Another benefit may be in the form of a relaxation of network issues, e.g., may provide a solution for relay-based networks (e.g., multiple relays supporting FD may transmit simultaneously). Another benefit may include throughput improvement, e.g., the access point AP may use scheduling in the uplink for efficient usage of the channel.

Interference Cancellation

In order to support full-duplex communications, a number of interference cancellation schemes may be performed. When the access point and the first station STA1 are full-duplex capable, then the only interference they may experience is self-interference. Each of the device may be equipped with circuits (and/or software) to suppress self-interference using known techniques. However, a different approach may be taken to suppress cross-interference that takes place when only the access point is operating in a full-duplex scheme (e.g., STR) in accordance with one or more embodiments.

Figure 6:
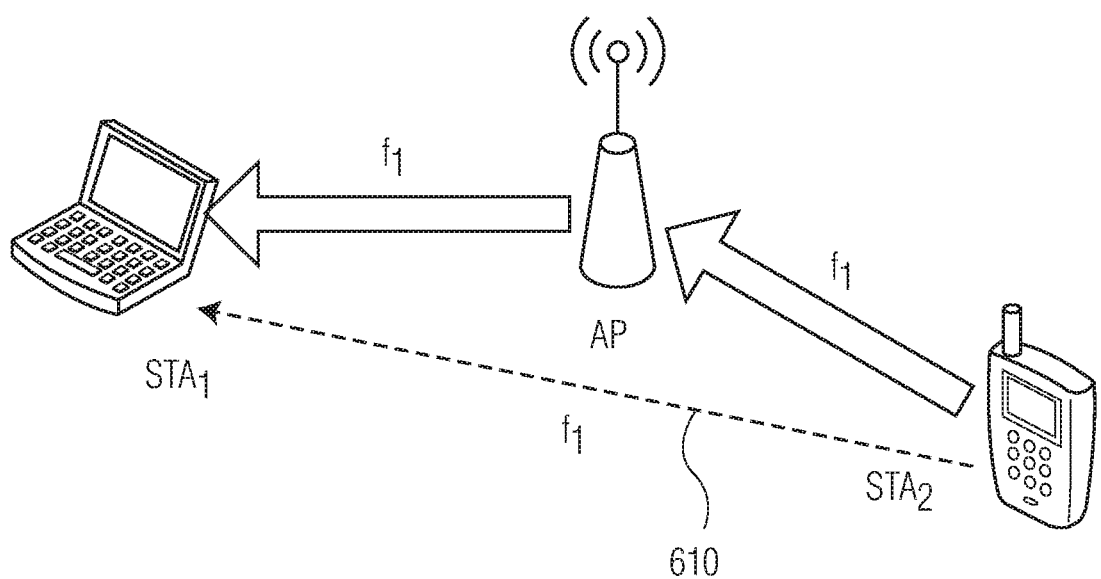
FIG. 6 illustrates an example of cross-interference.

FIG. 6 illustrates an example of how cross-interference may occur when signals transmitted from the second station STA2 to the access point AP at frequency $f_1$ are also simultaneously received by the first station STA1 along a wireless signal path 610 extending directly between stations STA1 and STA2. Because the first station STA1 is also set to receive signals at frequency $f_1$ (from the access point AP), the first station STA1 is susceptible to receiving signals transmitted from the second station STA2 to the access point AP along this frequency, when both stations are within range of the wireless access point. When the first station STA1 receives signals transmitted from the access point and the second station STA2 simultaneously at the same frequency $f_1$, reception of the signals from the access point AP may be adversely affected.

In order to achieve efficient and effective communications, the first station STA1 may be isolated from transmissions by the second station STA2 by implementing a cross-interference suppression method integrated into the control software and/or circuitry of the first station STA1. In accordance with one embodiment, a method for performing cross-interference suppression in one or both of the stations may be achieved through implementation of a polling and pairing algorithm.

Figure 7:
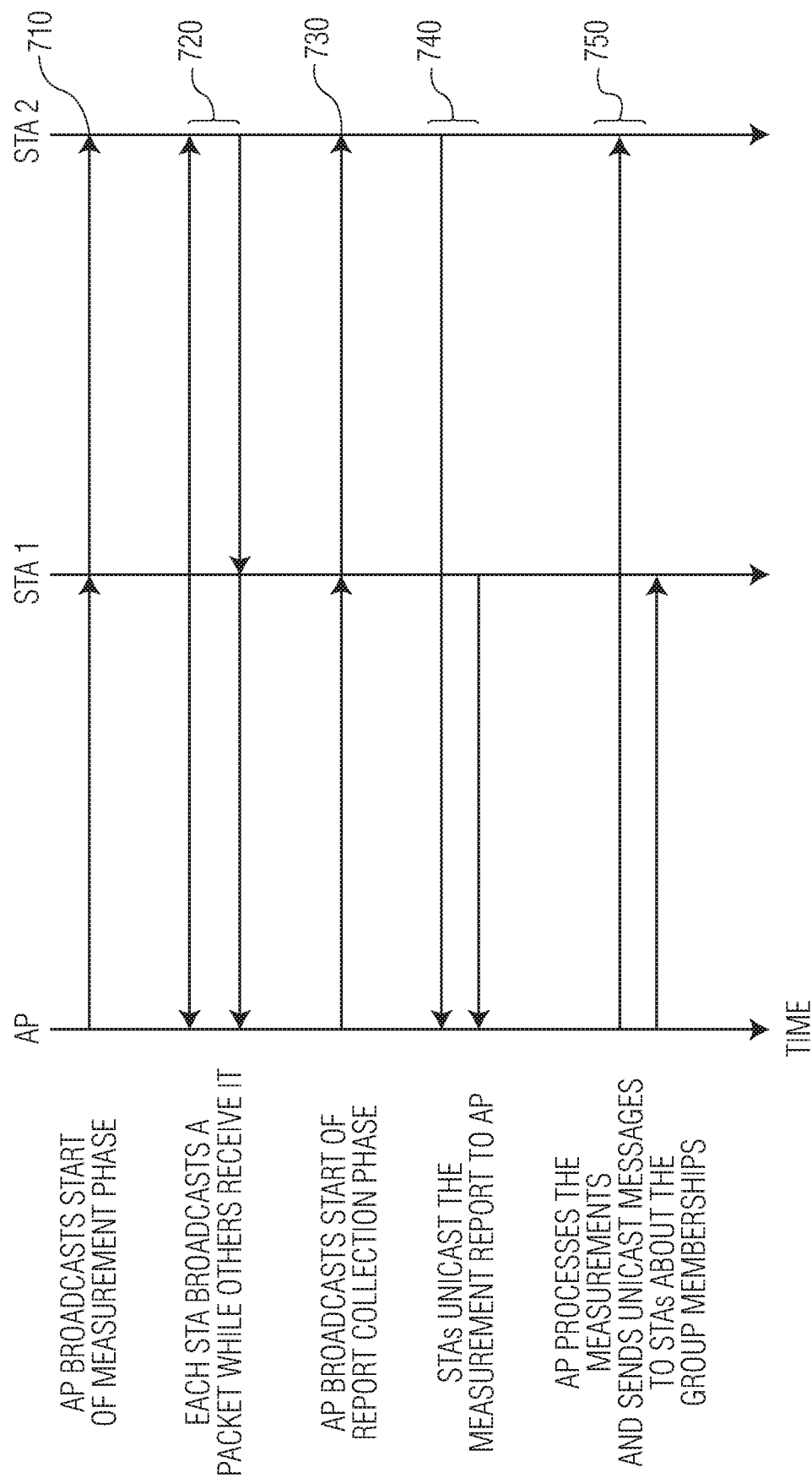
FIG. 7 illustrates an embodiment for creating groups of stations for performing simultaneous transmit and receive (STR) communications.

FIG. 7 illustrates a method which may be implemented by the access point AP for polling the mobile stations within range. For a WiFi implementation, the indoor range may be, for example, up to 250 feet. For other implementations, the range may be greater or less than 250 feet. In operation 710, the access point AP broadcasts a signal indicating the start of a polling (or measurement) phase. The broadcast signal is received by stations STA1 and STA2. The broadcast signal may be a WiFi broadcast packet with a control field indicating that it marks beginning of the measurement phase. It may additionally include the list and sequence of the stations that should transmit during the measurement phase, type of packets to be transmitted in the measurement phase and total duration of the measurement phase. Stations not listed in the broadcast signal may optionally transmit in the measurement phase. A part of the measurement phase can be contention free and the remaining part of the measurement phase can be contention based.

In operation 720, station STA1 broadcasts a packet which is received by the access point AP, station STA2, and any other stations that may be within range of the access point. Also, station STA2 broadcasts a packet which is received by the access point AP and the other stations within range of the access point AP. The broadcast packets 720 may be a non-data packet (NDP) as defined by WiFi standard. Access point can optionally describe the parameters of this packet, such as packet duration, transmit power, MCS etc., in the broadcast signal 710.

In operation 730, the access point AP broadcasts a signal indicating start of a report collection phase. The report collection phase involves transmission of a broadcast packet 730 indicating report collection phase. It can allocate the time for the report collection phase by setting appropriate network allocation vector (NAV). In can additionally indicate the parameters to be included in the report such as transmitter address of the measured packet, maximum and minimum power received during the transmission, channel condition etc.

In operation 740, stations STA1 and STA2 (and any other stations that may be in range of the access point AP) unicast the measurement reports to the access point. For example, stations STA1 and/or STA2 transmit signals in response to the report-collection phase signal. The response signals are received by the access point. The response packet may include a list of measurement reports. Each of the measurement report contains the parameter indicated by the access point in the broadcast signal 730. The response packets are addressed only to the access point, i.e., unicast packets.

In operation 750, the access point AP processes the measurements and sends unicast messages to the stations about the group memberships. For example, the access point AP implements an algorithm to designate one or more groups of stations based on the response signals. Each group may include a plurality of stations. In one embodiment, each group may include two stations and each station may be in one or more groups. The grouping algorithm may involve pairing mobile stations (e.g., STA1 and STA2) within range of the access point for which full-duplex communications, or simultaneous transmit and receive (STR), of the access point and the stations is possible. The access point may assign a different identifier to each group.

In one embodiment, a combined identifier may be assigned to the station in each group. The combined identifier may include the group ID and the ID of the specific station within the group. In one embodiment when a group contains only two stations, the stations are selected such that they do not receive much cross interference from each other. In other embodiments when a group contains one master station and multiple slave stations, the slave stations are selected such that each of the slave station and master station do not receive much cross interference from each other whereas the slave stations receive the signal from each other with sufficient strength. The more details about the grouping mechanism is provided in greater details later.

In terms of addressing, each station may be addressed by its MAC ID or combined identifier. The MAC ID may be used, for example, for half-duplex communications and the combined ID may be used for full-duplex communications. When a station receives a packet addressed to its group, the station may determine the action to perform based on the type of the packet. In one embodiment, the station may also use one or more STR-specific parameters to determine the action to be performed. Examples of STR-specific parameters include level of transmission power, type of modulation and coding scheme (MCS), and packet duration. The action may be either to participate in or to refrain from FD/FDDF communication during the transmission of the packet. STR specific parameters can influence this decision.

Some examples of such decisions could be as follows: 1) FD/FDDF communication only if the packet duration is greater than a threshold; 2) FD/FDDF communication only if the packet's MCS is less than a certain MCS threshold; 3) no FD/FDDF communication if the packet is a control frame; and 4) when a station determines to perform FD/FDDF communication, the transmit power of the second transmission is determined based on the MCS of the packet. For example, the permissible transmit power is low, if the first packet is transmitted with a high MCS.

Figure 8A:
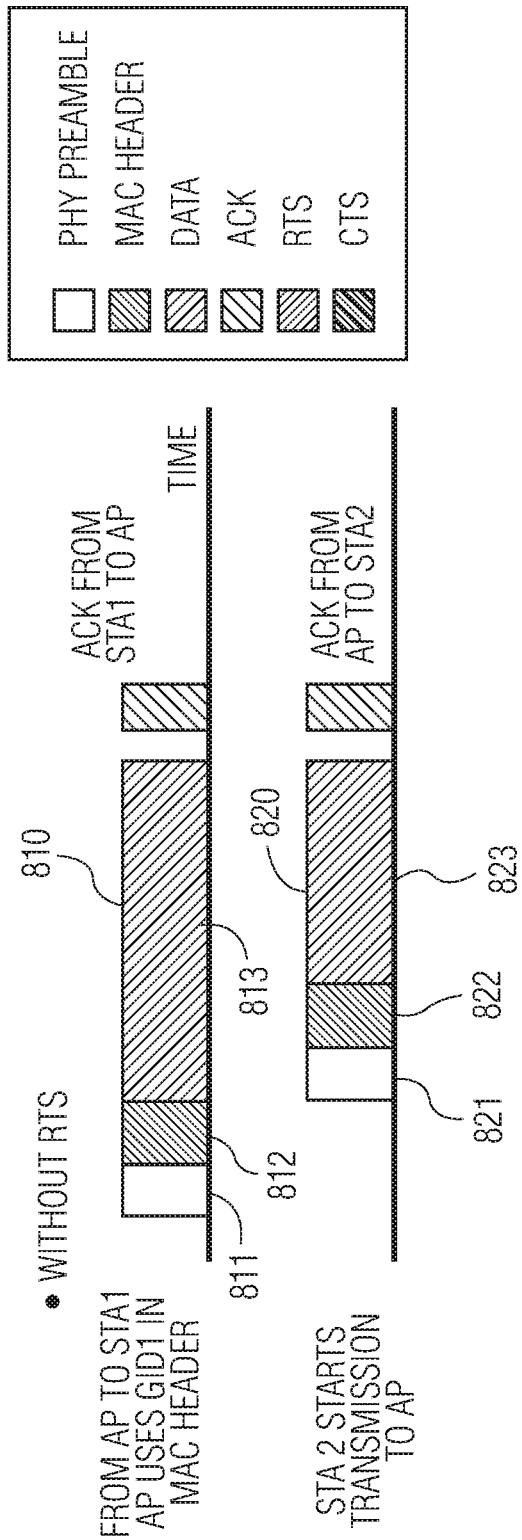
FIGS. 8A and 8B illustrate examples of packets and messaging for performing full-duplex or full-duplex different-frequency communications.

FIG. 8A illustrates an embodiment of a method for performing a simultaneous transmit and receive (STR) messaging between an access point AP and stations STA1 and STA2 in the same group. This method embodiment may be initiated by the access point AP and is performed without request-to-send/clear-to-send (RTS/CTS) messaging. The method includes the access point AP transmitting a first packet 810 to station STA1 through the downlink channel. The first packet includes a preamble 811, a MAC header 812, and a data payload 813. The MAC header includes the group identifier (GID1) for station STA1, which links this station to station STA2 for STR communications.

Station STA2 transmits a second packet 820 to the access point AP through the uplink channel during a period which overlaps the period of transmission of the first packet 810. The uplink and downlink channels may correspond to the same frequency (e.g., f), to thereby achieve full-duplex (or STR) communications. In another embodiment, the uplink and downlink channels may correspond to different frequencies, or frequency bands, within the operating bandwidth of the access point and thus may correspond to FDDF communications. In one embodiment, station STA2 may synchronize transmission of its packet with the packet transmitted from the access point to station STA1 based on packet duration information. For example, synchronization may be achieved based on packet duration information available in NAV of the first packet, as previously explained. There may be no special handshake required for FDDF communication. The exchange may occur during the association process itself.

The second packet 820 includes a preamble 821, a MAC header 822, and a data payload 823. As illustrated in FIG. 8A, the termination points of the first and second packets are aligned. The alignment of these packets ensures that the acknowledgment signal transmitted from station STA1 to the access point does not collide with the data payload portion of the second packet, and that the acknowledgment signal transmitted from the access point to station STA2 does not collide with the data payload portion of the first packet.

Figure 8B:
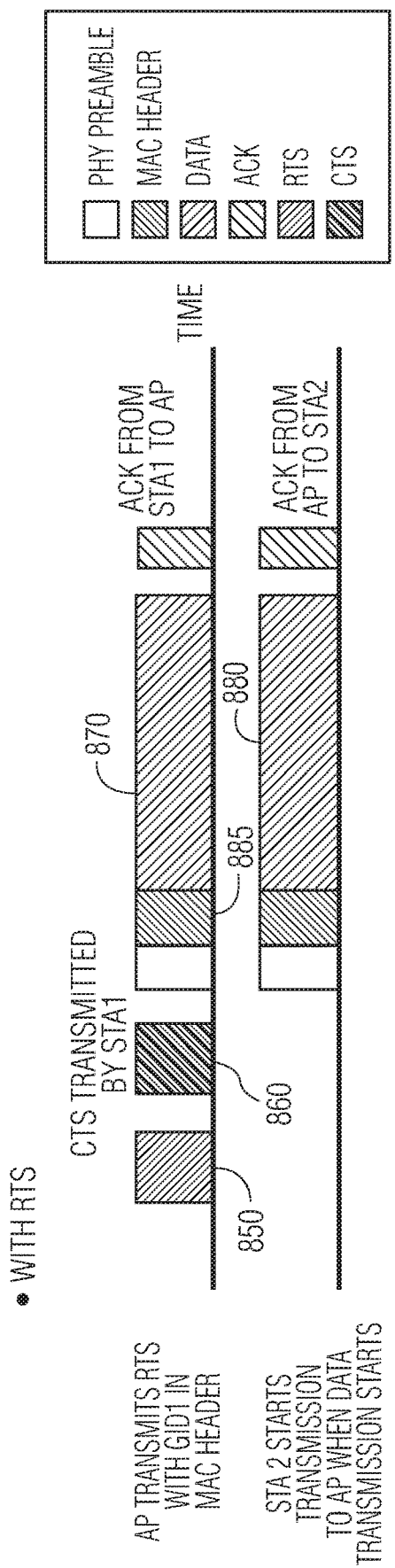

FIG. 8B illustrates another embodiment of a method for performing simultaneous transmit and receive (STR) messaging between an access point AP and stations STA1 and STA2 in the same group. In this embodiment, the method may be initiated by the access point AP and is performed with RTS/CTS messaging prior to transmission of an initial data packet. The uplink and downlink channels may correspond to the same frequency, to thereby achieve full-duplex (or STR) communications. In another embodiment, the uplink and downlink channels may correspond to different frequencies, or frequency bands, within the operating bandwidth of the access point and thus may correspond to FDDF communications.

The method includes the access point AP transmitting a request-to-send (RTS) message 850 to station STA1. Station STA1 then transmits a clear-to-send (CTS) message 860 to the access point AP in response to the RTS message. Once this handshaking of signals is performed, the access point AP transmits data packet 870 to station STA1 and station STA2 transmits data packet 880 to the access point AP. The transmission of packets occurs in overlapping periods, with packet 870 including a MAC header 885 containing the group identifier for linking together both stations in the same group. The alignment of the transmitted packets 870 and 880 ensures that the acknowledgment signals are also aligned, namely ACK from station STA1 to the access point and ACK from the access point to station STA2. RTS and/or CTS messages also may be addressed to the group using group identifier. RTS reserves the medium until the ACK transmission is complete. Similarly, CTS may also reserve the medium until the ACK transmission is complete. This reservation may be facilitated due to the NAV in RTS and CTS. This enables the transmitters to synchronize the packets.

Embodiments which implement RTS/CTS messaging may be beneficial in some cases. For example, RTS/CTS may ensure that full-duplex transmission is protected, e.g., CTS messages may protect the receiver and RTS may operate to perform CTS messaging in full-duplex communications. RTS and CTS allow clean estimates of the self-interference channel. In case of multiple-input multiple-output (MIMO) scenario, extra HE-LTF (one LTF for each Tx antenna, and not one LTF per spatial stream) may be used. Also, RTS/CTS may allow for same interference levels, RSSI, and LNA gain settings throughout the transmission.

Figure 9A:
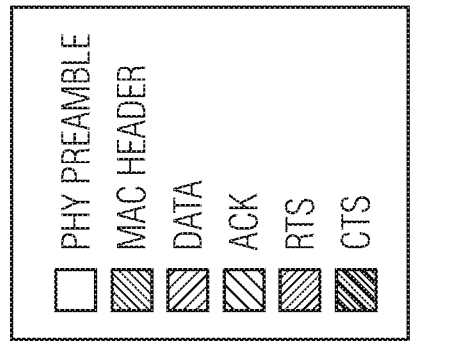
FIGS. 9A and 9B illustrate examples of packets and messaging for performing full-duplex or full-duplex different-frequency communications.
Figure 9A:
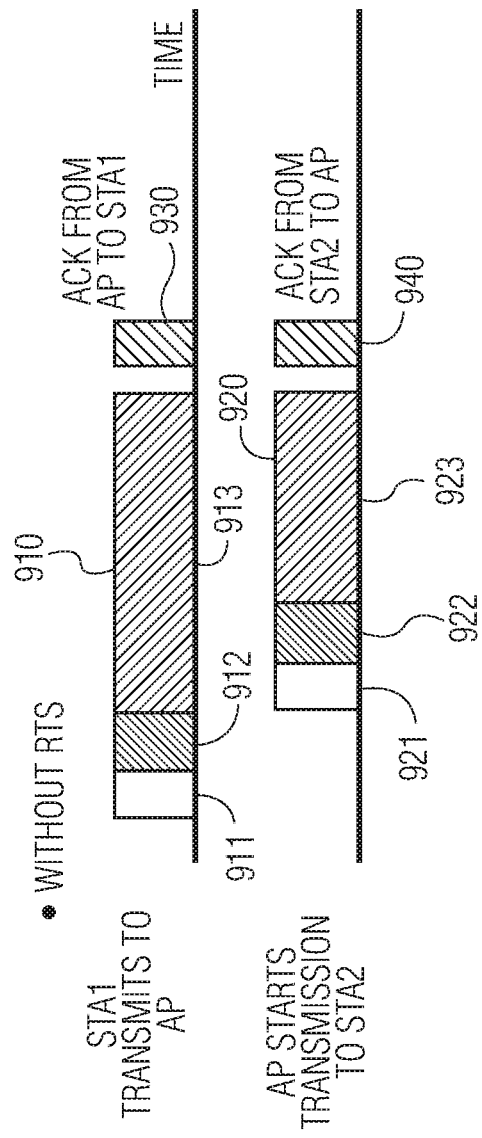

FIG. 9A illustrates an embodiment of a method for performing simultaneous transmit and receive (STR) messaging between an access point AP and stations STA1 and STA2 in the same group. This method may be initiated by one of the stations and is performed without RTS/CTS messaging. The method includes the station STA2 transmitting a first packet 910 to the access point through the uplink channel. The first packet 910 includes a preamble 911, a MAC header 912, and a data payload 913.

In one embodiment, the stations may not determine performance of STR communications. That decision may be performed by the access point. Moreover, the MAC header may include addresses of the sender and the receiver and may also include NAV (time for which the medium is reserved). The access point may determine that station STA1 is paired with station STA2 based on a polling process. For example, the access point formed the group STA1 and STA2 based on measurement reports, for example, as set forth in FIG. 7.

The method also includes the access point transmitting a second packet 920 to station STA1 through the downlink channel during a period which overlaps the period of transmission of the first packet 910. The second packet may include a preamble 921, a MAC header 922, and a data payload 933. The uplink and downlink channels may correspond to the same frequency, to thereby achieve full-duplex (or STR) communications. In another embodiment, the uplink and downlink channels may correspond to different frequencies, or frequency bands, within the operating bandwidth of the access point and thus may correspond to FDDF communications. The first and second packets 910 and 920 have termination points (or ends) that are aligned, which ensures that corresponding acknowledgment signals 930 and 940 from stations STA2 and STA1 occur coincidentally.

Figure 9B:
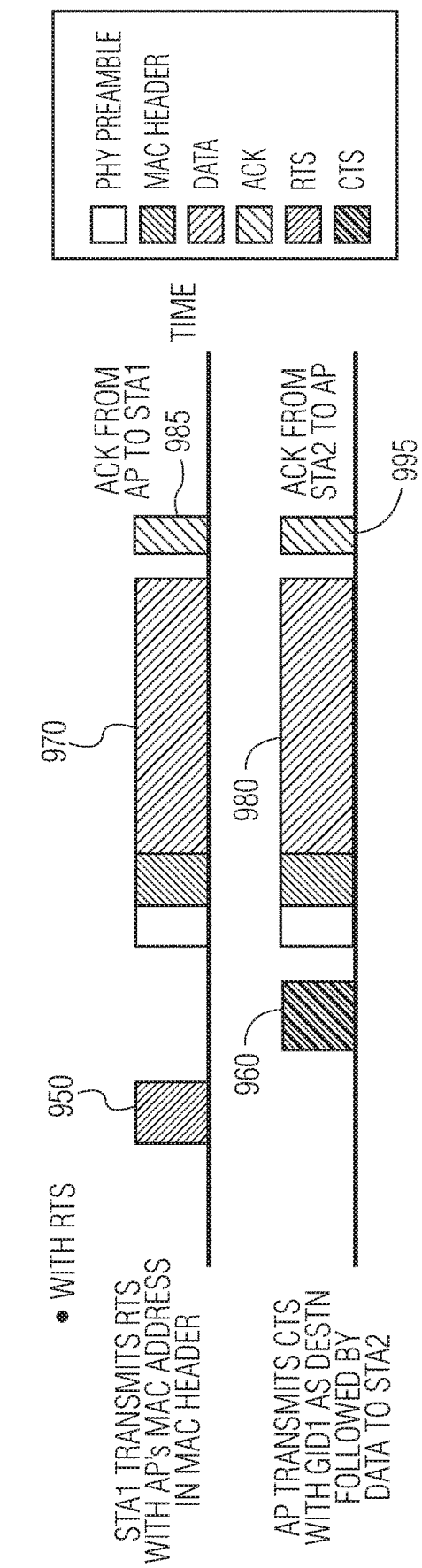

FIG. 9B illustrates an embodiment of a method for performing simultaneous transmit and receive (STR) protocol between an access point AP and stations STA1 and STA2 in the same group. This protocol may be initiated by STA2 and may be performed with RTS/CTS messaging prior to transmission of the initial packet. The uplink and downlink channels may correspond to the same frequency, to thereby achieve full-duplex (or STR) communications. In another embodiment, the uplink and downlink channels may correspond to different frequencies, or frequency bands, within the operating bandwidth of the access point and thus may correspond to FDDF communications.

The protocol includes the station STA1 transmitting a request-to-send (RTS) message 950 to the access point AP. The access point then transmits a clear-to-send (CTS) message 960 to station STA1 in response to the RTS message. Once this handshaking of signals is performed, the station STA2 transmits data packet 970 to the access point, and the access point transmits data packet 980 to the station STA1. The transmission of packets 970 and 980 occurs simultaneously, with packet 970 including a MAC header 771 containing the group identifier for linking together both stations in the same group. The alignment of transmitted packets 970 and 980 ensures that the acknowledgment signals are also aligned, namely the ACK signal 985 from the access point to station STA1 and the ACK signal 995 from the station STA2 to the access point.

Figure 10A:
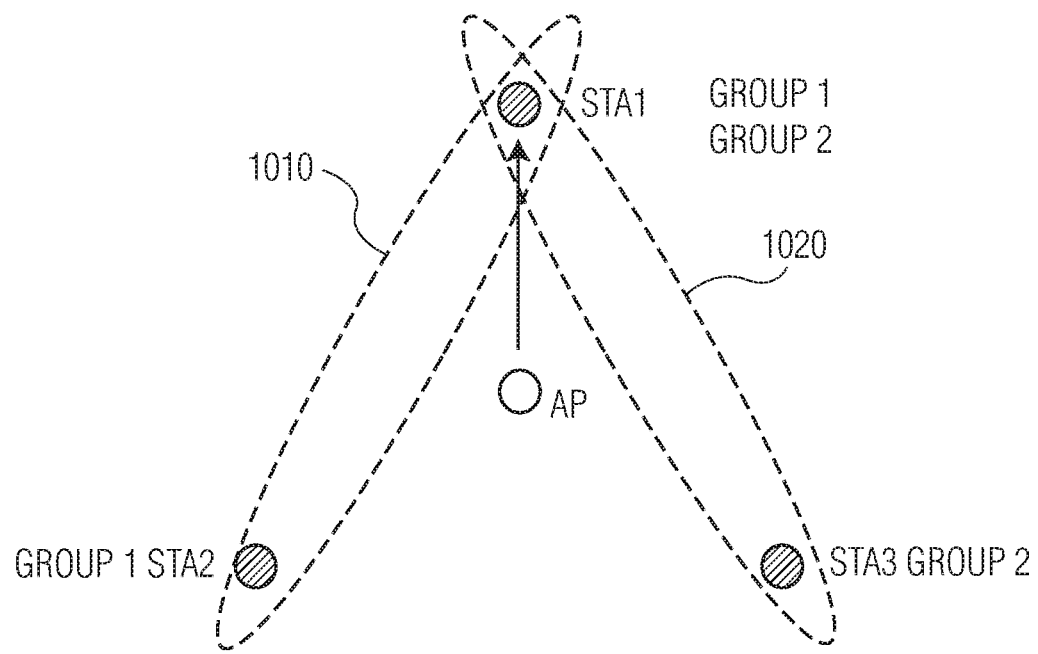
FIGS. 10A and 10B illustrate examples for grouping stations relative to an access point for performing full-duplex or full-duplex different-frequency communications.
Figure 11A:
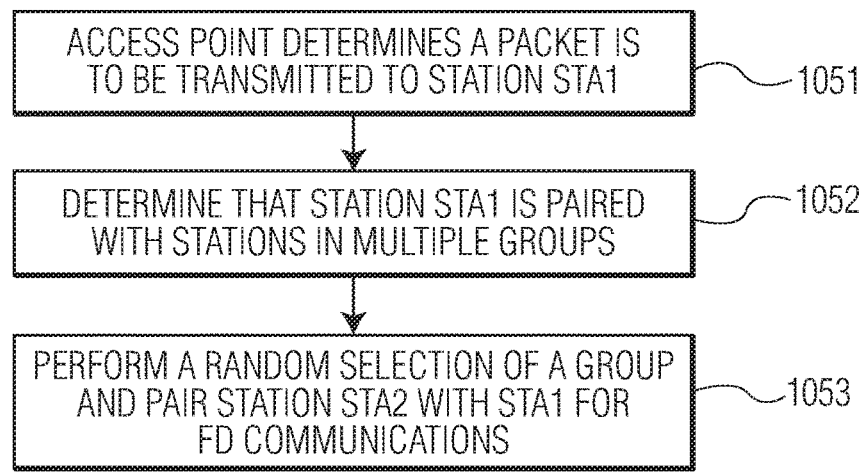
FIGS. 11A and 11B illustrate embodiments of method for grouping stations and controlling full-duplex or full-duplex different-frequency communications.

FIGS. 10A and 11A illustrate an embodiment of a method for selecting a group of stations for performing access-point initiated STR communications. In this embodiment, two groups 1010 and 1020 are shown. The first group 1010 includes station STA1 and station STA2. The second group 1020 includes station STA1 and station STA3. Thus, in this example scenario, the size of each group is limited to two stations.

The method includes, at 1051, the access point 1030 determines that a packet is to be transmitted to station STA1. At 1052, after the packet has been transmitted, a processor of the access point determines which station to pair with station STA1 for purposes of performing STR (or full-duplex) communications over the same frequency. This determination is made by retrieving information from a database indicating which group(s) station STA1 belongs to. The pairing may be performed in accordance with any of the grouping embodiments described herein. In the present example, the access point processor determines that station STA1 is in two groups 1010 and 1020.

At 1053, when the processor of access point 1030 determines that multiple stations are paired with station STA1, the processor may a random selection of one of the groups. When the access point processor selects group 1010, the processor pairs stations STA1 and STA2 for STR communications, e.g., the access point will transmit one or more subsequent packets to station STA1 over the downlink channel at the same time and frequency as the access point receives one or more subsequent packets from station STA2.

Figure 10B:
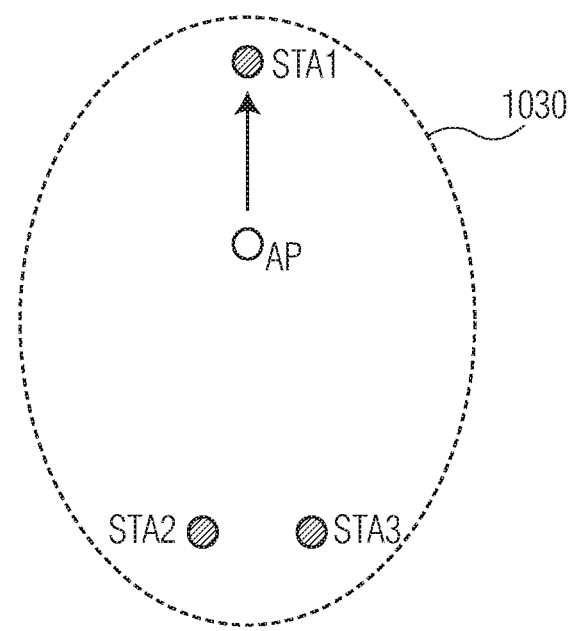
Figure 11B:
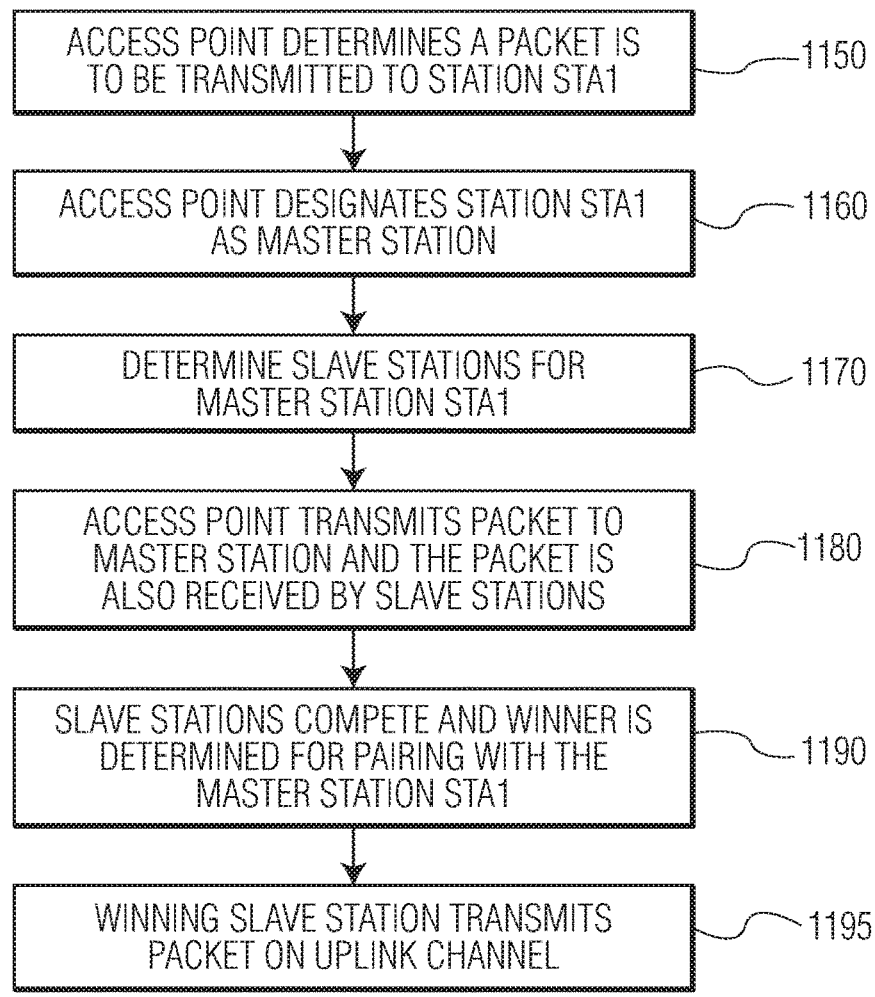

FIGS. 10B and 11B illustrate another embodiment of a method for selecting a group for access-point initiated STR communications. In this embodiment, the processor of the access point implements a master-slave algorithm for a group 1030 that may include two or more stations. The method includes, 1150, the access point 1030 determining that a packet is to be transmitted to station STA1. Based only the polling and measurement protocol mentioned in FIG. 7, access point has already grouped STA1 with multiple other stations. For illustrative purposes, the group may include three stations, STA1, STA2, and STA3 wherein STA1 is the master station and STA2 and STA3 are the slave stations. Note that the master slave relation is limited to the group. In some other group STA 1 can be slave station to some other master, say STA2.

At 1170, the processor of the access point retrieves information from a database indicating which other stations are grouped with station STA1. These other stations (in this case, STA2 and STA3) may automatically be designated slave stations or one or more of the other stations may be designated a slave station based on satisfying one or more conditions. For example, the one or more other stations may be designated as slaves provided the station(s) are at least a predetermined distance away from the station STA1. The predetermined distance may be a distance where cross-interference does not adversely affect the ability of station STA1 to receive packets from the access point. For example, such a distance may be predetermined or designated as a distance which does not decrease the signal-to-noise ratio by a predetermined amount. Another condition may include the ability of all of the slave STAs in the group to receive packets from one another with at least a minimum signal-to-noise ratio. In one embodiment, both conditions may be required in order to qualify as a slave station. Slave stations in the group which do not meet the required condition(s) may be omitted, at least for purposes of the current STR session.

At 1180, when the access point transmits (broadcasts) a packet to station STA1, the slave stations STA2 and STA3 also receive this packet. Processors in the slave stations acquire a group identifier in the packet and determine whether those stations belong to the same group as station STA1. At 1190, the slave stations then compete with one another for access to the uplink channel by using the CSMA protocol for medium access.

The CSMA protocol may operate, for example, in in the following way. A station that wants to transmit first chooses a random back off, i.e., a random amount of time that it will wait before transmitting. It sets a timer with this duration and starts down counting it if the medium is free. If at any point, the medium is busy, it stops the timer. The timer will restart again when the medium becomes free. (This back off needs to be random. If all the station that want to transmit pick same backoff, they will start transmitting at the same time and will collide.)

The process of checking if medium is free is called carrier sensing. Clear channel assessment (CCA) is asserted when station determines that the medium is free. Medium is considered busy if either of the two conditions are met: 1) the received power is above certain threshold (which we are calling CCA threshold) and 2) station decodes another WiFi packet (by finding a particular signal). The CCA threshold is quite low.

Generally when one station is transmitting and the cross interference is above the CCA threshold, station will not transmit. But if we still want to do STR, we want the station to transmit when there is a weak cross interference. Hence station will increase CCA threshold for the packets transmitted by/to the master station in its group. This way it can go on and transmit the packet even if it hears a WiFi packet.

At 1195, the slave station that wins transmits a packet on the uplink to the access point at a timing that overlaps transmission of a subsequent packet from the access point to station STA1 on the downlink channel. In order to enable these operations, the clear channel assessment (CCA) threshold may be increased for the packets transmitted by/to STA1. The CCA threshold may be increased relative to the received strength signal indicator (RSSI) from the access point. In addition, a random backoff may be selected and transmitted if the CCA is successful for the duration of the backoff.

In order to implement the aforementioned grouping embodiments, the stations may operate based on control software that is compatible with the polling protocol. This may require a modification to the MAC protocol software implemented on the stations. Stations that are not updated with the modified MAC protocol software may not be able to participate in the measurement and reporting phases. In order to compensate, channel reciprocity may be assumed, where stations with and without the updated MAC protocol software are paired.

Echo Cancellation

Echo cancellation may be performed by the stations and/or access point in order to suppress interference and thus to prevent degradation in the quality of communications in full-duplex mode or FDDF mode. For example, in FD mode, the transmitted signal may leak back into the receiver in the physical layer. In accordance with one or more embodiments, echo cancellation methods may be implemented for baseband, in order to provide RF isolation of the receiver from signals transmitted by the transmitter.

Figure 12:
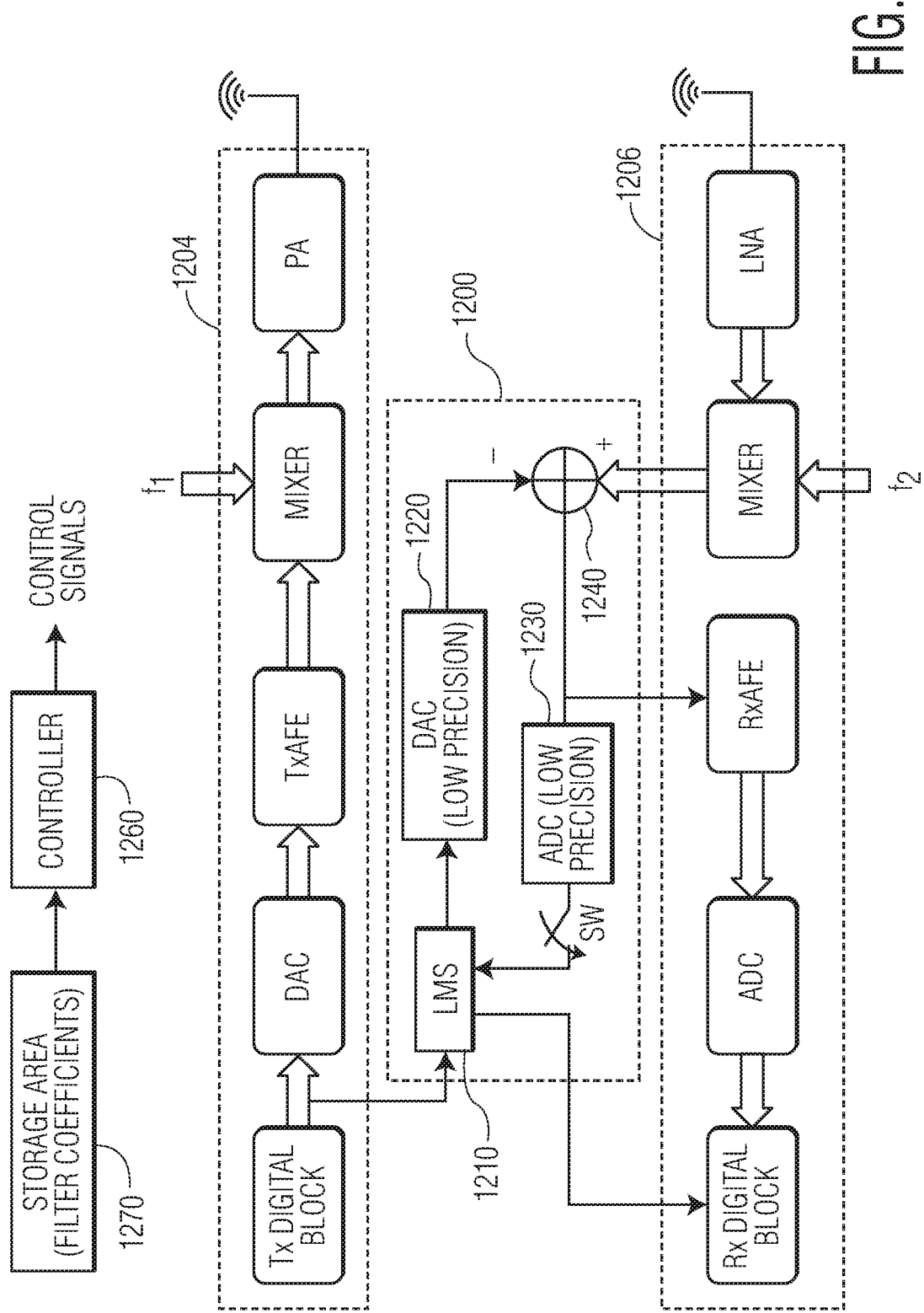
FIG. 12 illustrates an embodiment of transceiver logic equipped with a filter for performing echo cancellation for full-duplex or full-duplex different-frequency communications.

FIG. 12 illustrates an embodiment of echo cancellation logic 1200 that may be integrated into transceiver logic in the access point or stations, or both. In this case, the transmitter transmits based on downlink frequency $f_1$ and receives on uplink frequency $f_2$, and thus corresponds to an FDDF implementation. The echo cancellation logic suppresses leakage of signals transmitted by the transmitter into the receiver. The severity of the leakage may be proportional to the frequency separation between $f_1$ and $f_2$. In FIG. 12, the echo cancellation logic is integrated into the transceiver logic set forth in FIG. 3. However, the echo cancellation logic may be incorporated within different transceiver logic in other embodiments.

Referring to FIG. 12, the echo cancellation logic 1200 includes a least mean squares (LMS) filter 1210, digital-to-analog (DAC) converter 1220, analog-to-digital (ADC) converter 1230, and addition/subtraction logic 1240. The LMS filter is a type of adaptive filter that mimics a desired filter by determining filter coefficients that relate to producing the least mean square of an error signal. In the present case, the coefficients cause filter 1210 to suppress signals, transmitted by the transmitter portion 1204 of the transceiver logic, in the receiver path at a position after the low noise amplifier (LNA). The coefficients and control software for the controller 1260 may be stored in storage area 1270. The LMS filter 1210, therefore, performs echo cancellation of the transmitter signal, which, in turn, improves the reception quality of the transceiver logic. The DAC 1220 is coupled between the LMS filter and the addition/subtraction logic 1240, and the ADC 1230 is selectively coupled to the LMS filter through switch 1250, which has a state controlled by controller 1260. In one embodiment, the ADC and DAC may be run at relatively low predetermined precisions.

In order for the echo cancellation logic to operate properly, the LMS filter 1210 must first be trained in order to determine the proper coefficients for suppressing the transmitter signal. The training mode may be performed initially and, in one embodiment, may be re-trained on a periodic basis thereafter.

Figure 13:
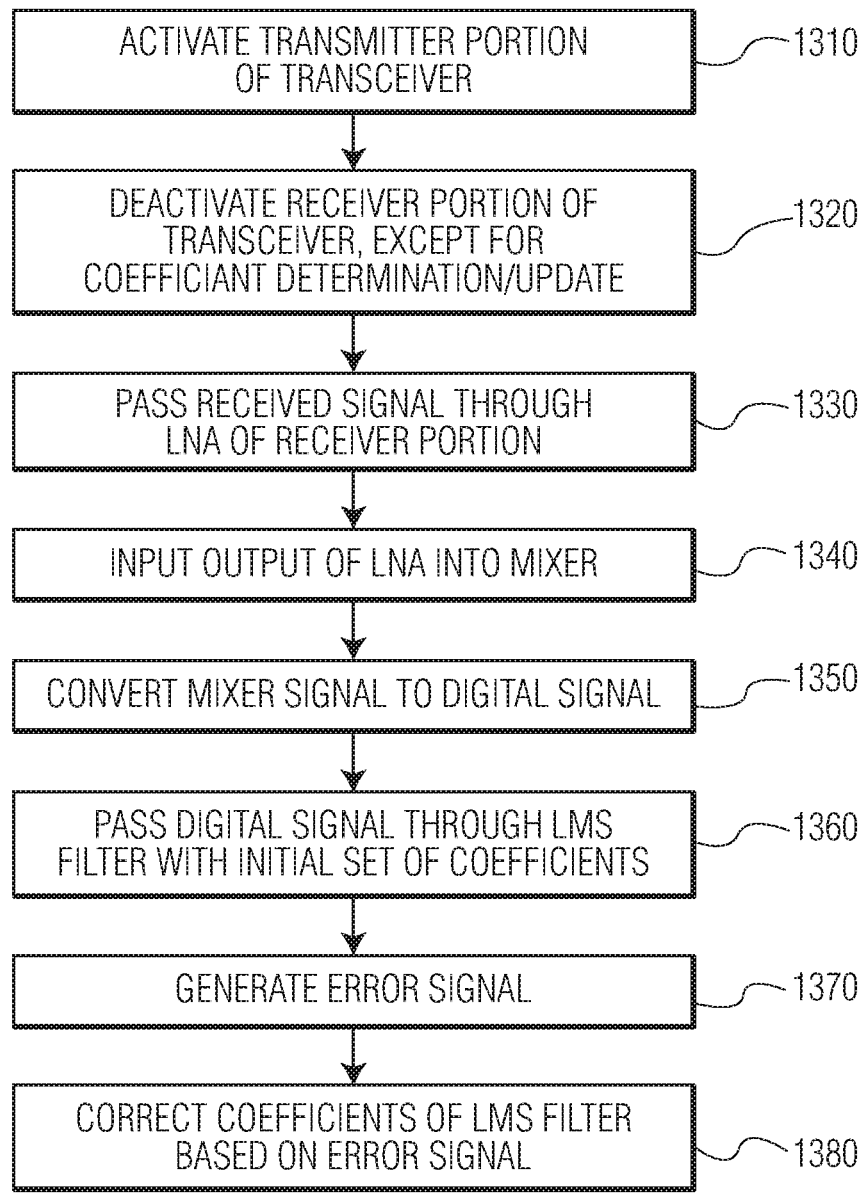
FIG. 13 illustrates an embodiment of a method for determining coefficients for a filter that suppresses transmitter leakage in a receiver.

FIG. 13 illustrates an embodiment of a method for training the LMS filter. The operations of this method may be performed by controller 1260 based on instructions stored in storage area 1270. The storage area 1270 may also store the filter coefficients as described herein.

Referring to FIG. 13, the method includes, at 1310, activating the transmitter portion 1204 of the receiver logic based on one or more first control signals. At 1320, the receiver portion of the transceiver logic 1206 is activated for purposes of performing coefficient update. However, training of the LMS filter may be deactivated except for purposes of performing coefficient updates. Also, in one embodiment the downlink channel may be acquired using a self clear-to-send (CTS) signal, so that no interfering signal is present during the training mode. At 1330, the transmitter signal is received and passed through the LNA of the receiver portion of the transceiver logic. At 1340, the output of the LNA is then input into the mixer, where a frequency translation is performed based on frequency $f_2$ to generate a mixer output signal $m_r(t)$, which may correspond to a baseband or intermediate-frequency signal. The mixer output signal $m_r(t)$ is then input into the echo cancellation logic 1200.

More specifically, at 1350, mixer output signal $m_r(t)$ converted to a digital signal by ADC 1230. Then, the controller 1260 generates a second control signal to close the switch SW to input the digital mixer output signal $x_r(n)$ into the LMS filter 1210. The digital mixer output signal $x_r(n)$ may be considered to be a digital version of the received transmitter (TX) signal. At 1360, the transmitter digital signal (TX digital $x_r(n)$) is passed through LMS filter and then through the DAC 1220 to generate analog filtered signal $y_1(n)$. At 1370, an error signal $e_1(t)$ is generated based on the error function: $e_1(t)=m_r(t)-y_1(t)$, where the subtraction may be performed by the addition/subtraction logic 1240. At 1380, the error signal is then passed through the ADC 1230 and used as a basis for updating the filter coefficients of the LMS filter 1210.

In one embodiment, the LNA gain may be settle at a fixed value when Full Duplex UL transmission is performed. If the signals received by the receiver do not affect the gain of the LNA, then single set of filter coefficients may be sufficient to use. On the other hand, if the received signal power is greater than a predetermined value and reduces the LNA gain, then different filter coefficients may be derived based on signals received during additional iterations of the training mode.

Figure 14:
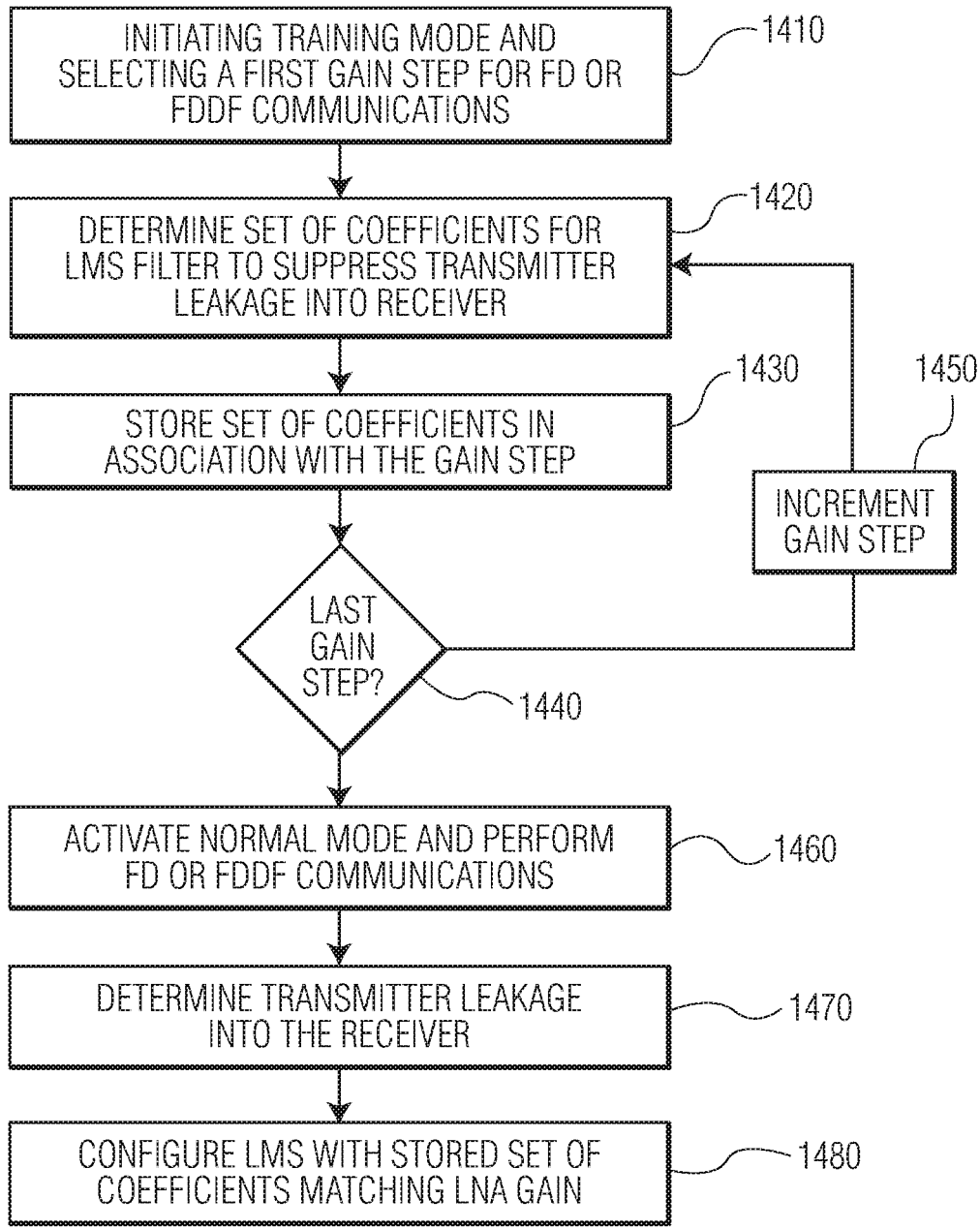
FIG. 14 illustrates an embodiment of a method for controlling coefficients for a filter that suppresses transmitter leakage in a receiver.

FIG. 14 illustrates a method for configuring the LMS filter 1210 to suppress interference caused by leakage of the uplink (UL) transmitter signal into the receiver portion of the transceiver logic. The method involves performing multiple training iterations, where each iteration is performed for a different gain to generate a different set of coefficients for that particular gain. When trained, the corresponding set of coefficients may be retrieved from memory and applied to the LMS filter based on the power of the received signal the LNA gain that is generated by that power. For example, different levels of power of the received signal may cause the LNA gain to change and thus sets of coefficients are determined for each gain change to suppress interference in the receiver caused by leakage of the transmitter signal. Each set of coefficients may include one or more coefficients of the LMS filter.

Referring to FIG. 14, the method includes, at 1410, initiating training mode and selecting a first gain step $k_1$ of N gain steps ($k_1, k_2, \ldots, k_N$) during a first iteration for FD or FDDF communications, where N is the highest gain within a predetermined operating range of the LNA. The N gain steps may be equally spaced or may be spaced according to a predetermined pattern determined, for example, based on the operating bandwidth of the transceiver logic.

At 1420, for the first gain step $k_1$, a first set of coefficients for the LMS filter are determined that will suppress interference in the receiver portion of the transceiver logic caused by transmission of a signal on the uplink channel.

At 1430, once the set of filter coefficients have been determined for the first gain step, the set of filter coefficients is stored for the $k_1$ gain step. The coefficients are stored for later retrieval in order to suppress transmitter leakage into the receiver logic when the LNA settles on a gain which corresponds to gain step $k_1$.

At 1440, a determination is made as to whether gain step $k_1$ is the last gain step.

At 1450, if the gain step is not the last gain step, then the gain step is incremented by one in the case where $k_1$ is the lowest gain step. (In the case where the first gain step is the highest gain step, training the LMS filter may be performed by decrementing the gain steps and determining respective sets of the LMS filter coefficients). After changing the gain step, operations 1420 to 1440 are repeated for gain step $k_2$. This process continues for remaining ones of the gain steps until respective sets of filter coefficients are determined for all of the N gain steps. In one embodiment, the sets of filter coefficients may be different from one another, e.g., each set of filter coefficients may have at least one different coefficient from the other sets of coefficients.

At 1460, once the filter coefficients for the last gain step have been stored, the operational (or normal) mode may be activated and communications take place between the access point and groups of stations in FD or FDDF mode. During this time, at 1470, leakage of the transmitter signal into the receiver portion of the transceiver logic is determined by measuring the power of the received transmitter signal and determining how the gain of the LNA has changed as a result of the measured power. The measurement may be performed by the controller of the transceiver logic in comparison to one or more reference values. In one embodiment, the actual power may not be measured, but only the change in LNA gain (which may be proportional to the received transmitter signal power).

At 1480, once the change in LNA gain (or the LNA gain itself) is determined by the controller, the controller retrieves the set of coefficients from the storage area generated during the training mode that most closely matches the changed value of the LNA gain and then configures the LMS filter to use a set of filter stages corresponding to the LNA gain level. As a result, transmitter leakage suppression may be efficiently and effectively performed.

Figure 15:
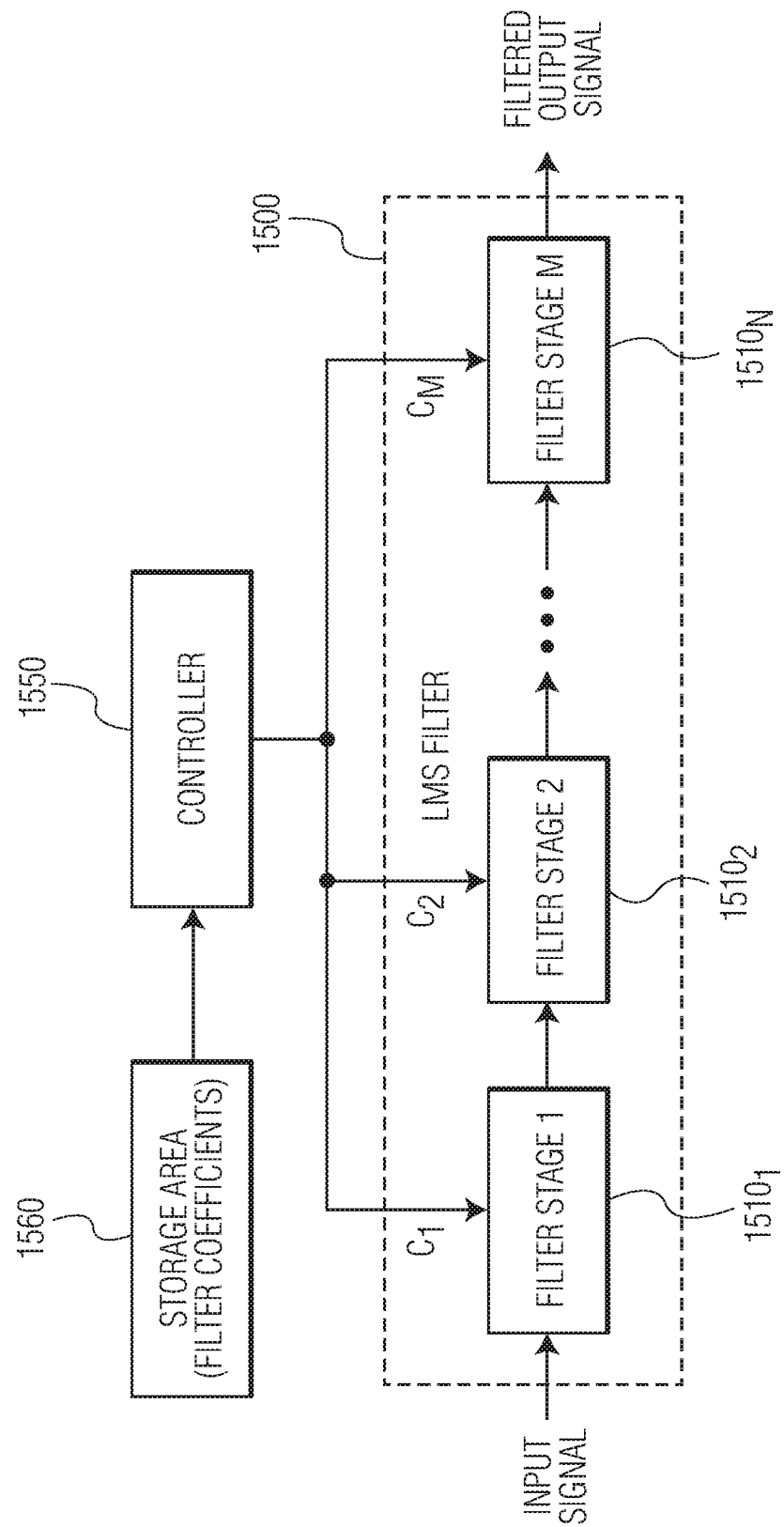
FIG. 15 illustrates an embodiment of a multi-stage filter.

FIG. 15 illustrates an embodiment of the LMS filter 1500 that may be trained and operated in accordance with the aforementioned method embodiments. The LMS filter includes a cascaded arrangement of LMS filter stages $1510_1$ to $1510_N$, where N≥1. The first filter stage $1510_1$ receives an input signal which, for example, may correspond to the digital mixer output signal $x_r(n)$ previously described, which signal contains the leakage from the transmitted signal. Each filter stage operates based on a respective one of a set of coefficients $C_1, \ldots, C_M$ that are trained and stored in the training mode previously described. Once the coefficients of the LMS filter stages are configured by the controller, then the stages may be selected based upon the LNA gain to sequentially filter the input signal based on gains set by respective ones of the coefficients.

The resulting signal output from the LMS filter excludes interference, generated from the transmitter portion of the transceiver logic (e.g., self-interference), from the data/message received from FD or FDDF communications. As previously indicated, the LMS filter may be included in the stations, the access point, or both.

Such a cascaded LMS filter may be trained by modifying the LMS filter stage coefficients according to a predetermined sequence. For example, from a gain k, the next gain stages may have gains of $k_1, k_2, \ldots, k_M$. For an initial gain step k (which may be an initial gain step or the gain at which the LMS filter is presently set), filter stage 1 coefficient(s) may be adjusted while the filter coefficients of the other LMS filter stages may be fixed to an initial state. The initial state of each filter stage may be the same value or different values as predetermined by filter designers and/or based on the operating characteristics of the host device (e.g., access point or station) and/or the mode of operation (e.g., FD, FDDF, or another mode) to be performed. In one embodiment, each filter stages may have multiple coefficients.

The gain of the filter may then be incremented (or decremented) to the next gain step 2. At this point, the coefficient(s) for filter stage $1510_1$ is maintained at the adjusted value set in the first iteration and the coefficient(s) for filter stage $1510_2$ coefficients are adjusted. Subsequent filter stages (which have not yet been adjusted may be maintained at their respective initial states). The gain step is then incremented (or decremented).

For the next gain step, filter stages $1510_1$ and $1510_2$ are kept fixed at their adjusted values and the coefficient(s) of a third filter stage is adjusted. Any subsequent filter stages are maintained at their initial state gain/coefficient(s) values at this time. The gain step is then incremented (or decremented) and this process continues stage-by-stage, adjusting the next stage coefficients while the other filter stages remain at either their previously adjusted values or initial values (for filter stages whose coefficient(s) have not yet been adjusted). This process continues until all of the gain stages have been trained with coefficients/gain values that effectively (e.g., optimally) suppress transmitter leakage in the receiver portion of the transceiver logic. During training, any transient effects may be reduced through this stage-by-stage adjustment method because only one filter coefficient (or set of filter coefficients) for each LMS filter stage is changed in comparison to remaining ones of the stages in the filter. A controller 1550 may control these operations based on instructions stored in storage area 1560. Also, the sets of filter coefficients may be stored in this storage area or another storage area.

Thus, in accordance with the aforementioned embodiments, one set of filter coefficients for the LMS filter may be used for each gain step of the LNA to support FD or FDDF communications. When the gain of the LNA settles at k with leakage, a different one of the corresponding sets of filter coefficients (derived during training mode) may be retrieved from memory and used for that settled gain. During training mode, the LNA gain may be decreased or increased in finite steps and the step size may vary over various iteration of LNA changes. In one embodiment, different combinations of filter stages may be enabled, with corresponding sets of filter coefficients, to achieve an aggregated gain that matches the current or changed gain of the LNA. In order to accomplish this, the controller may generate enable signals to activate the combination of filter stages that corresponds to the LNA gain for purposes of suppressing transmitter leakage in the receiver portion of the transceiver logic.

In one embodiment, in addition to performing echo cancellation, logic may be coupled prior to the LNA along the signal path in order to suppress self-interference. The logic may perform radio frequency (RF) and antenna isolation between the transmitter and receiver portions of the transceiver logic. Performing cancelation before the LNA may avoid receiver signal saturation at the LNA due to the transmitter signal. While the embodiments are described herein as being performed by an access point and stations within range of the access point, other embodiments corresponding to the systems, devices, and methods herein may be applied for communications between other devices, whether those communications take place according to an 802.11 standard or another type of communication standard different from 802.11. Also, the stations described herein may operate as access points.

Figure 16:
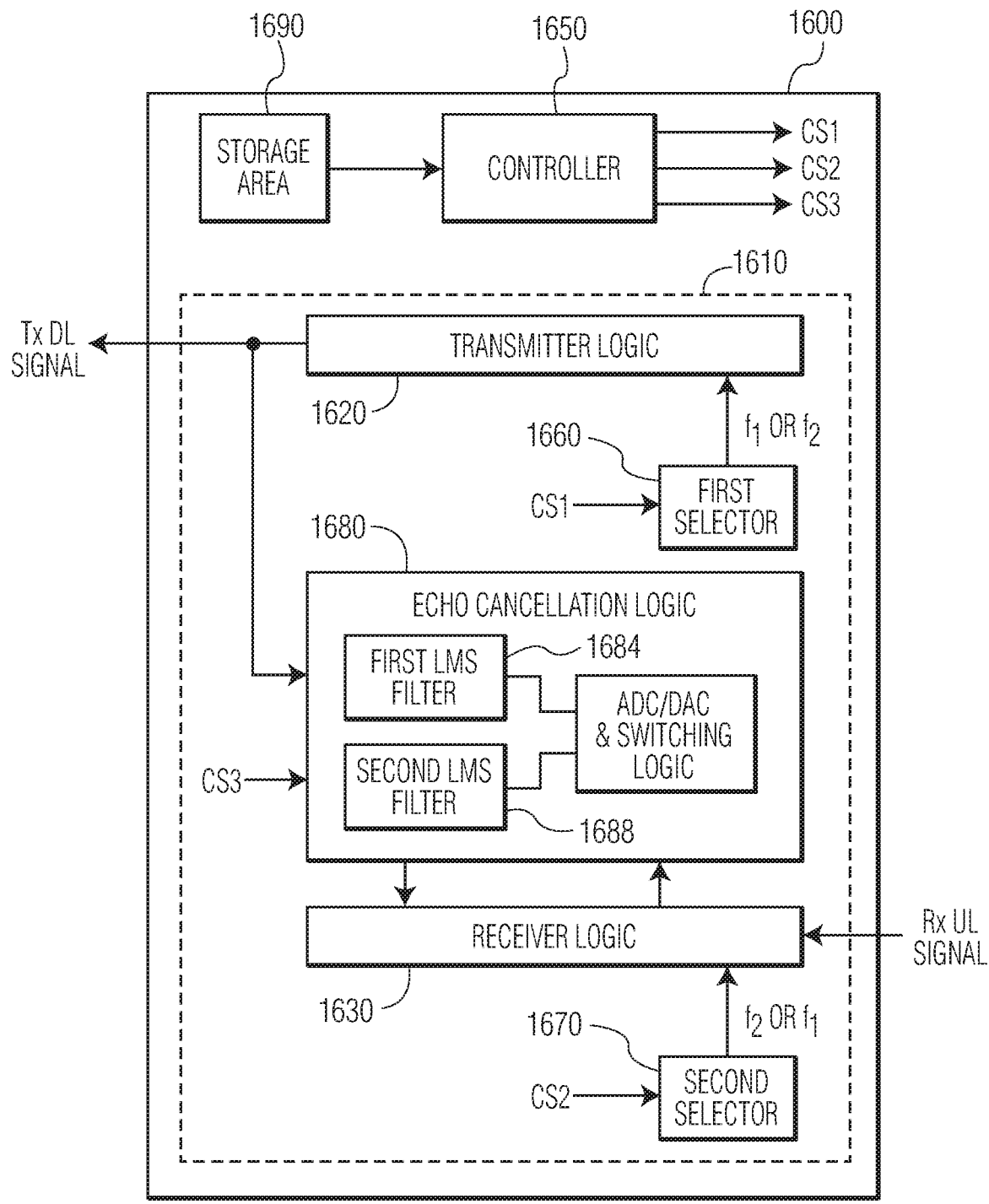
FIG. 16 illustrates an embodiment of a transceiver including multiple filters for suppressing transmitter leakage during full-duplex or full-duplex different-frequency communications.

FIG. 16 illustrates an embodiment of a device 1600 for performing FDDF communications. The device may be a station, an access point, or another device within or coupled to a communications network or link, e.g., which may conform to 802.11 or another standard. The device may be a smartphone, tablet, notebook computer, smartwatch, workstation, server, or another type of device.

Referring to FIG. 16, the device 1600 includes a controller 1650 for controlling operation of transceiver logic 1610, which includes transmitter logic 1620 that transmits on one frequency and receiver logic 1630 that receives on a second frequency different from the first frequency. The first and second frequencies may correspond to the frequencies, or frequency bands, of the FDDF embodiments described herein. The transmitter uplink (UL) and receiver downlink (DL) frequencies are selected from frequencies $f_1$ and $f_2$. In operation, the UL and DL chain logic can change arbitrarily for carrier frequencies $f_1$, and $f_2$, e.g., $f_1$ can be used for the UL channel at time $t_1$ and then used for the DL channel at time $t_2$, the same may be true for frequency $f_2$. In order to ensure FDDF operation, selectors 1660 and 1670 may be included to select the frequencies for the transmitter logic and receiver logic, e.g., the UL channel and DL channel frequencies. The frequencies selected by selectors 1660 and 1670 may be determined by select control signals CS1 and CS2 generated by the controller 1650.

In order to suppress leakage into the receiver logic 1630 from the signals transmitted from the transmitter logic 1620, echo cancellation logic 1680 may be coupled to the transmitter logic 1620 and receiver logic 1630. The echo cancellation logic 1680 may be similar to the echo cancellation logic in previous embodiments, except that echo cancellation logic 1680 includes two LMS filters, namely a first LMS filter 1684 and a second LMS filter 1688. The first LMS filter 1684 may suppress interference in the receiver logic 1630 caused by leakage that is generated when the transmitter logic 1620 uses frequency $f_1$ for the DL channel and the receiver logic uses frequency $f_2$ for the UL channel. The second LMS filter 1688 may suppress interference in the receiver logic caused by leakage that is generated when the transmitter logic uses frequency $f_2$ for the DL channel and the receiver logic uses frequency $f_1$ for the UL channel. The LMS filters 1684, 1688 may perform these operations based on further processing performed by ADC, DAC, and switching logic 1685, which, for example, may correspond to the same logic shown in the echo cancellation logic of FIG. 12 in an analogous context for respective ones of the LMS filters.

In one embodiment, only one of the LMS filters 1684, 1688 may be activated during normal mode. Activation of the LMS filter may be selectively controlled based on the logical value of control signal CS3 generated by the controller 1650, e.g., the first LMS filter may be selected when CS3 has logical zero and the second LMS filter may be selected when CS3 has logical one. Each of the LMS filters 1684,1688 may be individually trained to derive a plurality of sets of filter coefficients for corresponding gain steps or gain changes as previously described. In one embodiment, each LMS filter 1684,1688 may include a cascaded arrangement of filter stages as also previously described.

In some circumstances, the UL and DL frequencies may change during operation. The controller 1650 may detect this change and the control the selectors 1660,1670 accordingly to continue FDDF communications. When this occurs, the controller 1650 may also generate control select signal CS3 to select the appropriate LMS filter, and retrieve from storage area 1690 the appropriate set of filter coefficients for the selected LMS filter in accordance with previously described embodiments, for continuing FDDF operation even though a frequency change has taken place. The storage area 1690, or another storage area, may store instructions for execution by the controller 1650 to perform the operations described herein.

The controllers, filters, filter stages, ADC logic, DAC logic, mixers, transceiver, transmitter, and receiver logic, selectors, switches, amplifiers, AFEs, and other signal-generating and signal-processing features of the embodiments disclosed herein may be implemented in logic which, for example, may include hardware, software, or both. When implemented at least partially in hardware, the controllers, filters, filter stages, ADC logic, DAC logic, mixers, transceiver, transmitter, and receiver logic, selectors, switches, amplifiers, AFEs, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, filters, filter stages, ADC logic, DAC logic, mixers, transceiver, transmitter, and receiver logic, selectors, switches, amplifiers, AFEs, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. The embodiments may be combined to form new embodiments. Accordingly, the foregoing disclosure, description, and figures are for illustrative purposes only and do not in any way limit the invention, which is defined only by the claims.

We claim:
1. An access point, comprising:
transmitter logic configured to transmit a first signal;
receiver logic configured to receive a second signal;
a controller to select a group of stations within range of the access point,
wherein the controller is configured to control the transmitter logic to transmit the first signal to a first station of the group of stations through a downlink channel and to control the receiver logic to receive the second signal from a second station of the group of stations through an uplink channel to the access point, the first signal transmitted during a first period and the second signal received during a second period overlapping the first period to perform full-duplex different-frequency (FDDF) communications based on an 802.11 standard between the access point and the first station and the second station;
wherein the first station is assigned a combined identifier which includes a group identifier of the group of stations and an identifier of the first station; and wherein the first signal to the first station includes the combined identifier to indicate to the second station to perform the FDDF communication; and
wherein the controller is configured to control the transmitter logic to transmit a third signal to the first station of the group of stations through the downlink channel and to control the receiver logic to receive a fourth signal from the second station of the group of stations through the uplink channel to the access point, the third signal transmitted during a third period and the fourth signal received during a fourth period not overlapping the third period to perform half duplex communications between the access point and the first station and the second station, wherein the third signal includes the identifier of the first station and not the group identifier to indicate to the second station to perform the half duplex communication; and
echo cancellation logic to cancel the first signal received at a receiver, the echo cancelation logic comprising a plurality of filter stages for canceling the first signal, wherein a set of filter coefficients for a first stage is not changed and a set of filter coefficients for a second stage in cascade with the first stage is changed when a gain level of a low noise amplifier (LNA) of the receiver which receives the first signal and the second signal changes from one gain step to a next gain step.
2. The access point of claim 1, wherein:
the downlink channel corresponds to a first frequency band in the operating bandwidth of the access point, and
the uplink channel corresponds to a second frequency band in the operating bandwidth of the access point.
3. The access point of claim 1, wherein:
the first signal includes a first data packet with a first termination point,
the second signal includes a second data packet with a second termination point, and
the first termination point of the first data packet is aligned in time with the second termination point of the second data packet.
4. The access point of claim 1, wherein the FDDF communications is based on the 802.11 standard implemented for orthogonal frequency division multiple access (OFDMA).

5. The access point of claim 3, wherein the controller controls the transmitter logic to transmit the first data packet before the receiver logic receives the second data packet.
6. The access point of claim 3, wherein the first data packet includes trigger information to initiate FDDF communications with the first and second stations.
7. The access point of claim 3, wherein the controller is configured to control the transmitter logic to transmit a first acknowledgement signal to the second station at a time aligned with receipt of a second acknowledgment signal from the first station.
8. The access point of claim 3, wherein the first data packet includes a medium access control (MAC) header including a group identifier and wherein the group identifier indicates that the first station and the second station are in the group of stations.
9. The access point of claim 1, wherein the controller is configured to control exchange of request-to-send (RTS) and clear-to-send (CTS) messages with the first station to initiate the FDDF communications.
10. The access point of claim 3, wherein the receiver logic is configured to receive a request-to-send (RTS) message from the first station and the transmitter logic is configured to transmit a clear-to-send (CTS) message to the second station to initiate the FDDF communications.
11. The access point of claim 1, wherein the second station competes with other stations belonging to the group of stations for access to the uplink channel based on the other stations detecting the group identifier in the first signal.
12. A method for controlling communication of information, comprising:
selecting a group of stations within range of an access point;
transmitting a first signal from the access point to a first station in the group;
receiving at the access point a second signal from a second station in the group;
wherein the first signal is transmitted to the first station through a downlink channel and the second signal is received from the second station through an uplink channel to the access point and wherein transmission of the first signal is during a first period and reception of the second signal is during a second period overlapping the first period to perform full-duplex different-frequency (FDDF) communications based on an 802.11 standard between the access point and the first station and the second station;
wherein the first station is assigned a combined identifier which includes a group identifier of the group of stations and an identifier of the first station; and wherein the first signal to the first station includes the combined identifier to indicate to the second station to perform the FDDF communication; and
wherein a third signal is transmitted to the first station of the group of stations through the downlink channel and a fourth signal is received from the second station of the group of stations through the uplink channel to the access point, the third signal transmitted during a third period and the fourth signal received during a fourth period not overlapping the third period to perform half duplex communications between the access point and the first station and the second station, wherein the third signal includes the identifier of the first station and not the group identifier to indicate to the second station to perform the half duplex communication
wherein receiving at the access point the second signal comprises canceling the first signal received at a receiver based on a plurality of sets of filter stages for canceling the first signal, wherein a set of filter coefficients for a first stage is not changed and a set of filter coefficients for a second stage in cascade with the first stage is changed when a gain level of a low noise amplifier (LNA) of the receiver which receives the first signal and the second signal changes from one gain step to a next gain step.

13. The method of claim 12, wherein:
the downlink channel corresponds to a first frequency band in the operating bandwidth of the access point, and
the uplink channel corresponds to a second frequency band in the operating bandwidth of the access point.

14. The method of claim 12, wherein:
the first signal includes a first data packet with a first termination point,
the second signal includes a second data packet with a second termination point, and
the first termination point of the first data packet is aligned with the second termination point of the second data packet.

15. The method of claim 12, wherein the FDDF communications is based on the 802.11 standard implemented for orthogonal frequency division multiple access (OFDMA).

16. The method of claim 14, wherein the first data packet is transmitted before the second data packet is received.

17. The method of claim 14, wherein the first data packet includes trigger information to initiate FDDF communications with the first and second stations.

18. The method of claim 14, further comprising:
transmitting a first acknowledgement signal from the access point to the second station at a time aligned with reception of a second acknowledgment signal from the first station.

19. The method of claim 14, wherein the first data packet includes a medium access control (MAC) header including a group identifier and wherein the group identifier indicates that the first station and the second station are in the group of stations.

20. The method of claim 14, further comprising:
controlling exchange of request-to-send (RTS) and clear-to-send (CTS) messages between the access point and the first station to initiate the FDDF communications.

21. The method of claim 14, further comprising:
receiving at the access point a request-to-send (RTS) message from the first station, and
transmitting a clear-to-send (CTS) message from the access point to the second station to initiate the FDDF communications.

22. The method of claim 12, wherein the second station competes with other stations belonging to the group of stations for access to the uplink channel based on the other stations detecting the group identifier in the first signal.

* * * * *